(12) United States Patent
Ahluwalia et al.

(10) Patent No.: US 11,567,921 B2
(45) Date of Patent: Jan. 31, 2023

(54) ROWGROUP CONSOLIDATION WITH GLOBAL DELTA ACCUMULATION AND VERSIONING IN DISTRIBUTED SYSTEMS

(71) Applicant: Microsoft Technology Licensing, LLC, Redmond, WA (US)

(72) Inventors: Rishabh Singh Ahluwalia, Bellevue, WA (US); Tianhui Shi, Issaquah, WA (US); Srikumar Rangarajan, Sammamish, WA (US); Steven John Lindell, Bellevue, WA (US); Sandeep Lingam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/358,886

(22) Filed: Jun. 25, 2021

(65) Prior Publication Data
US 2022/0318223 A1 Oct. 6, 2022

Related U.S. Application Data

(60) Provisional application No. 63/168,919, filed on Mar. 31, 2021.

(51) Int. Cl.
*G06F 16/22* (2019.01)
*G06F 16/2455* (2019.01)
*G06F 16/23* (2019.01)

(52) U.S. Cl.
CPC ...... *G06F 16/2282* (2019.01); *G06F 16/2219* (2019.01); *G06F 16/2329* (2019.01); *G06F 16/24552* (2019.01)

(58) Field of Classification Search
CPC ............. G06F 16/2282; G06F 16/2329; G06F 16/2219; G06F 16/24552; G06F 16/2322
See application file for complete search history.

(56) References Cited

U.S. PATENT DOCUMENTS 6,615,219 B1 * 9/2003 Bruso .................. G06F 16/10
707/699
8,375,011 B2 * 2/2013 Fox .................... G06F 16/951
707/695

(Continued)

FOREIGN PATENT DOCUMENTS

CN    114328565 A  *  4/2022

OTHER PUBLICATIONS

Randal, Paul, "Inside the Storage Engine: Anatomy of a page", Retrieved from: https://www.sqlskills.com/blogs/paul/inside-the-storage-engine-anatomy-of-a-page/, Oct. 3, 2007, 45 Pages.

(Continued)

*Primary Examiner* — Merilyn P Nguyen
(74) *Attorney, Agent, or Firm* — Fiala & Weaver P.L.L.C.

(57) ABSTRACT

Methods for rowgroup consolidation with delta accumulation and versioning in distributed systems are performed. The systems provide performant methods of row storage that enable versioned modifications of data while keeping and allowing access to older versions of the data for point-in-time transactions. The accumulation of valid rows, deletes, and modifications is maintained in blobs for rowgroups until a size threshold is reached, at which point the rows are moved into a columnar compressed form. Changes to data and associated metadata are stored locally and globally via appends, maintaining logical consistency. Metadata is stored in footers of files allowing faster access to the metadata and its associated data for transactions and instant rollback via metadata version flipping for aborted transactions, as well as lock-free reads of data.

20 Claims, 11 Drawing Sheets

(56) References Cited

U.S. PATENT DOCUMENTS

| | | | |
|---|---|---|---|
| 9,195,657 B2* | 11/2015 | Oks | G06F 16/00 |
| 9,535,932 B1* | 1/2017 | DeSantis | G06F 16/21 |
| 10,649,852 B1* | 5/2020 | Starling | G06F 11/1469 |
| 2004/0034643 A1* | 2/2004 | Bonner | G06F 16/2282 |
| 2011/0196900 A1* | 8/2011 | Drobychev | G06F 16/122 |
| | | | 707/812 |
| 2014/0046911 A1* | 2/2014 | Roomp | G06F 16/2365 |
| | | | 707/E17.002 |
| 2015/0074151 A1* | 3/2015 | Chaiken | G06F 16/221 |
| | | | 707/803 |
| 2016/0357740 A1 | 12/2016 | Deng et al. | |
| 2018/0365106 A1* | 12/2018 | Huang | G06F 3/064 |
| 2019/0007208 A1* | 1/2019 | Surla | H04L 9/0891 |
| 2019/0147078 A1* | 5/2019 | Dageville | G06F 21/602 |
| | | | 707/695 |
| 2019/0391879 A1* | 12/2019 | Jarvie | G06F 16/284 |
| 2019/0394162 A1* | 12/2019 | Chalakov | G06F 16/9574 |
| 2020/0142980 A1* | 5/2020 | Cseri | G06F 16/278 |
| 2021/0216515 A1* | 7/2021 | Zheng | G06F 16/221 |

OTHER PUBLICATIONS

He, et al., "RCFile: A Fast and Space-Efficient Data Placement Structure in Mapreduce-Based Warehouse Systems", In Proceedings of IEEE 27th International Conference on Data Engineering, Apr. 11, 2011, pp. 1199-1208.

Larson, et al., "Evolving the architecture of SQL Server for modern hardware trends", In Proceedings of the IEEE 31st International Conference on Data Engineering, Apr. 13, 2015, pp. 1239-1245.

Larson, et al., "Real-time analytical processing with SQL server", In Proceedings of the 41st International Conference on Very Large Data Bases, vol. 8, Issue 12, Aug. 2015, pp. 1740-1751.

"International Search Report & Written Opinion issued in PCT Application No. PCT/US22/020282", dated Aug. 19, 2022, 15 Pages.

* cited by examiner

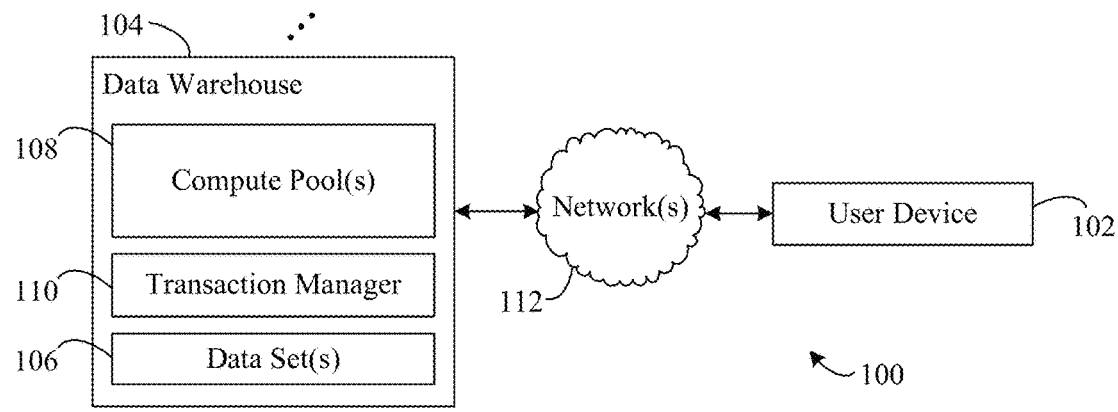

FIG. 1

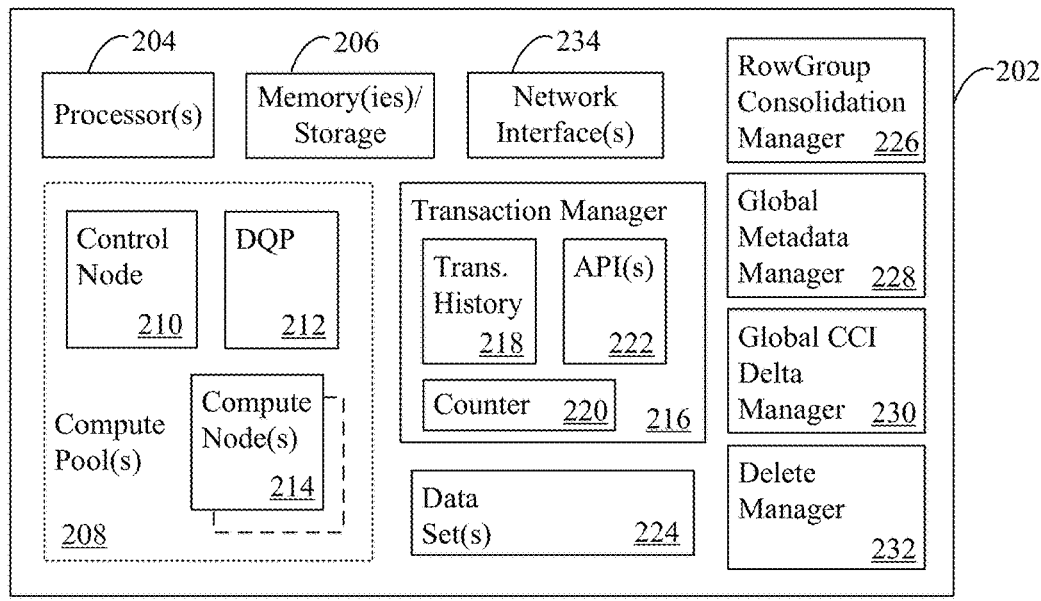

FIG. 2

| Perform data/row modifying transactions for tables of data in which pre-modified and modified data/rows are maintained in rowgroups of local and global blob data structures as uncompressed versioned entries that are appended to the rowgroups | ~302 |

↓

| Maintain globally-accessible metadata for open rowgroups that specifies updates, provides rowgroup size, maps logical row locations to physical row locations, and tracks deleted row information | ~304 |

ROWGROUP CONSOLIDATION WITH GLOBAL DELTA ACCUMULATION AND VERSIONING IN DISTRIBUTED SYSTEMS

CROSS-REFERENCE TO RELATED APPLICATION(S)

This application claims priority to U.S. Provisional Application No. 63/168,919, filed on Mar. 31, 2021, and entitled "ROWGROUP CONSOLIDATION WITH GLOBAL DELTA ACCUMULATION AND VERSIONING IN DISTRIBUTED SYSTEMS," the entirety of which is incorporated by reference herein.

BACKGROUND

Commercial database systems and data warehouses execute queries having extended execution times against large tables of data. Such queries may be received and executed while other queries are currently running, and this concurrency leads to operations on changed data by the executing queries that are not intended or desired. The modification, insertion, and deletion of rows in tables are tracked and independently or individually stored for rowgroups in a columnar format as segments within small file blobs (binary large objects), and metadata associated with these changed rows is locally stored.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for rowgroup consolidation with delta accumulation and versioning in distributed systems are performed. The systems provide performant methods of row storage that enable versioned modifications of data while keeping and allowing access to older versions of the data for point-in-time transactions. The accumulation of valid rows, deletes, and modifications is maintained in blobs for rowgroups until a size threshold is reached, at which point the rows are moved into a columnar compressed form. Changes to data and associated metadata are stored locally and globally via appends, maintaining logical consistency. Metadata is stored in footers of files allowing faster access to the metadata and its associated data for transactions and instant rollback via metadata version flipping for aborted transactions, as well as lock-free reads of data.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based at least on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 shows a block diagram of a computing system for rowgroup consolidation with delta accumulation and versioning in distributed systems, according to an example embodiment.

FIG. 2 shows a block diagram of a computing system for rowgroup consolidation with delta accumulation and versioning in distributed systems, according to an example embodiment.

FIG. 3 shows a flowchart for rowgroup consolidation with delta accumulation and versioning in distributed systems, in accordance with an example embodiment.

Figure 4:
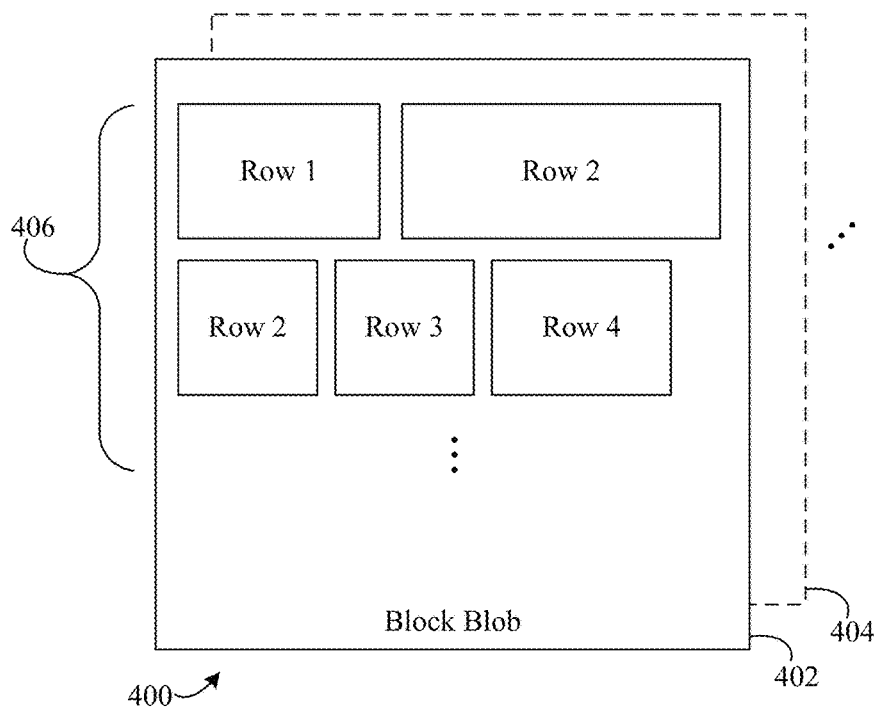
FIG. 4 shows a block diagram of an open rowgroup blob (binary large object) data structure for rowgroup consolidation with delta accumulation and versioning in distributed systems, in accordance with an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

In the context of the embodiments herein, e.g., for relational databases, a "data set" is stored as a "table" of data, and these terms, "tables" and "data sets" may be used interchangeably in the description.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for rowgroup consolidation with delta accumulation and versioning in distributed systems. Section III below describes example computing devices that may be used to implement features of the embodiments described herein. Section IV below describes additional examples and advantages, and Section V provides some concluding remarks.

II. Example Embodiments for Rowgroup Consolidation with Delta Accumulation and Versioning in Distributed Systems Methods for rowgroup consolidation with delta accumulation and versioning are performed by systems and devices. Various embodiments herein are directed to database systems and computing centers, which may be cloud-based, such as but not limited to, data warehouses, systems for "Big Data" analytics, enterprise systems, other database systems that store very large data sets, and/or the like, and while some embodiments are described in the context of data warehouse implementations, embodiments are not so limited. Described embodiments are applicable to any type of database server implementation, such as but not limited to, SQL Server® from Microsoft Corporation of Redmond, Wash. Additionally, embodiments are described for snapshot isolation versioning, but other versioning models are also adaptable to the described technics and are contemplated herein, such as but not limited to, RCSI (read committed isolation level) versioning, and/or the like.

In embodiments, a data warehouse system may comprise multiple compute pools (e.g., as virtual data warehouse instances) within a logical server. A compute pool may include, without limitation, a control node (i.e., a front end node), a distributed query processor (DQP), one or more compute nodes, and/or the like. Control nodes and associated DQPs may act as query endpoints that are responsible for producing a distributed plan for an incoming query and dividing work among a pool of compute nodes, where each compute node may be responsible for distributively processing data from one or more distributions, i.e., portions or distributions of a data set, of a large distributed table. Each control and compute node in the embodiments described may be configured to run/execute its own instance of a database server, each of which may be assigned a resource manager identifier unique to the data warehouse system. In embodiments, an instance of database server may comprise a portion of a node(s), a node, more than one node, etc.

In implementations, compute pools may share the same transaction manager node to start or commit a transaction. Additionally, queries are contemplated to be directed against a single, or multiple, databases (DBs), which may include writing across all databases within a logical server that comprise the same transaction manager node. That is, cross-DB query support is implicit in the described embodiments according to the versioning semantics. Embodiments herein also contemplate that different compute pools are enabled to operate on the same tables of databases within a system.

Data maintained in a table of a database is versioned such that multiple queries can be executed on specific data versions without data alterations affecting executing queries. As noted above, embodiments may be described with respect to different isolation levels or versioning, one of which is snapshot isolation. Examples described for snapshot isolation utilize data versions and a lock matrix where read queries do not take any locks for the execution thereof. The described protocol semantics also enable support for cross logical server transactions while supporting snapshot isolation consistency, and are extensible to support RCSI versioning. For instance, in snapshot isolation, read and write versions last for an entire transaction and the same values are utilized for each query, while in RCSI, a read version is updated for each query, and a write version is kept the same for an entire transaction. As an example, consider a scenario for snapshot isolation in which a transaction for a table begins, and a read version of '10' and a write version of 'NULL' are assigned. When a select operations is next performed, the read and write versions stay the same, but when a delete operation is subsequently performed, the transaction changes data and is promoted to a write transaction with the write version being provided with a value of '12', for example. In this scenario, subsequent select and insert operations for the table also have read versions of '10' and write versions of '12'. In contrast, an RCSI transaction, while also initially having a read version of '10' and a write version of 'NULL' assigned at the beginning, would have a read version of '11' assigned for the first select operation, and a read and write version of '12' assigned for the delete operation. The subsequent select operation would have a read version of '13' assigned with the write version of '12' maintained, and the insert operation would have a read version of '14' assigned with the write version of '12' maintained.

User transactions, when started on a control node of the system, e.g., a front end node that receives a user query, communicate with a transaction manager node that may be configured to return a token associated with each query. The tokens may include, without limitation, a transaction start identifier of the query (e.g., a transaction version), a query identifier, an active queries/transactions list, a partial abort list of recently aborted queries, a point-in-time, and/or the like. The token is passed down to compute nodes (e.g., backend nodes doing work on behalf of this transaction) via the compute node and a DQP. In embodiments, any compute node can also start a transaction to move data/files without blocking user queries, as data/files follow version chains according to the isolation protocol. Hence, most of the work done in the system is versioned, so no scan/read query is blocked behind any operation while maintaining support for the implemented versioning and append storages described for rowgroup consolidation with delta accumulation and versioning. Additionally, it contemplated herein that backend transactions, in addition to or lieu of user transactions, may be performed by systems according to the embodiments herein.

Each control/compute node in the system may keep local caches of aborted transaction which are synchronized with each query. A control node passes down the synchronizing information to the compute nodes in its compute pool via tokens, thus the compute nodes do not need to communicate with the transaction manager node for most queries. However, in embodiments, when a recently aborted query list is large, direct communication between compute nodes and the transaction manager node to obtain the list is provided. The transaction manager node is configured to maintain local caches to quickly service requests from the control node and the compute nodes and avoid data flow bottlenecks. In some scenarios, many queries in the system are read-only queries, and the embodiments herein provide for the transaction manager node to not be required to persist specific read-only query information, while maintaining the ability to return read versions with an active queries/transactions list when required.

An active queries/transactions list is stored in memory on the transaction manager node which reflects the true list for entire system and is always keeps synchronized with on-disk data (e.g., when needed to start write transactions). In embodiments, the system utilizes application programming interfaces (APIs) that are used to acquire locks for data-altering queries to be snapshot isolation consistent at the transaction manager schema layer of the system. This enables the ability to begin/commit and/or abort transactions in compliance with the isolation versioning. In embodiments, read-only transactions do not require commits or aborts, or tracking thereof, by the transaction manager node.

The described embodiments also enable queries across multiple databases within same logical server and/or across compute pools in the same logical server, using the same versioning semantics and methodology. Additionally, logical metadata operations also scan the correct snapshot version of the metadata for a given query, and this same snapshot is shared across multiple queries, e.g., in the absence of any data definitions or data definition language (DDL).

Different compute pools are also configured to access and work off the same data, and may also access previous versions of the data, according to embodiments, which provide, via delta stores and their management, a performant means of global row storage that enables versioned modifications while keeping and allowing access to older versions, and allows for accumulation of rows and their modifications until a size threshold is reached, at which point the rowgroups for the rows are closed and moved into a columnar, compressed form, which may be stored in user storage.

Rows in embodiments are organized into files that consist of an updatable metadata section, and an append-only data section. As rows are added, they are appended to the end of the data section of the file, and the metadata at the end of the file is updated to reflect the new file properties. Each collection of files is paired with a collection of delete files. These delete files are used to mark rows as deleted. When a row is designated to be deleted by a transaction, a corresponding row is inserted into the delete files to indicate deletion of the row. If a row is updated, a corresponding row is inserted into the delete files to record the effective deletion of the prior row version, and a new row with the updated value is inserted into the delta store (e.g., an uncompressed, open rowgroup in a blob, such as but not limited to, a block blob). Each row, in both data files and delete files, is stamped with a version to identify the version at which it was introduced.

The above semantics allow maintenance of all versions of the rows. Readers are then able to read rows of whichever version is desired, while filtering out rows and deletes as needed.

Two versions of metadata are always maintained in the updatable metadata section of each file. Writers take exclusive access to a file and overwrite the aborted or oldest version of the metadata. This way, if the writer aborts, the previous version of the metadata is valid and available. Scanners always use the latest committed version of the metadata, and do not see the in-progress metadata until the writer commits. Aborted rows are overwritten by the next writer. This enables instant rollback of aborted writes. Instant rollback is achieved, e.g., through metadata version flips and transaction-level file locking.

Once a collection of files is deemed large enough, they can be extracted out and compressed into a columnar format, efficient for larger magnitudes of rows.

No-lock reads are also enabled herein, based at least on, e.g., the append-only mechanics, and delete-insert semantics for updates and deletes. Embodiments allow readers to read files of their version without locks, and readers can pick up new changes once versions become visible. Additionally, regarding historical data, the append-only semantics along with delete files allow the maintenance of historical data of the rows and modifications of the rows.

For storage aspects, embodiments are enabled for the handling petabytes of data. To query data at this scale, the data is stored in a form that is efficient and lends to faster query performance, per embodiments, e.g., in columnar format for improved data compression and faster read and write access to tables as compared to conventional row-based storage.

Consolidated rowgroup storage, as described herein, is a performant storage architecture introduced for columnar format storage which has logically consistent metadata and append operations support. Columnstore data is stored in collections of rows called rowgroups, which has each column grouped, compressed, and encrypted into segments. In the model of the embodiments herein, the compressed, encrypted column segments may be grouped together along with encoding dictionaries of the rowgroup into one block blob.

Rather than storing column segments independently in many kilobytes size of blobs, as in some prior solutions, embodiments consolidate data buffers of column segments in memory and create megabytes size blobs for entire rowgroup data by issuing a single write operation. That is, via embodiments, lesser numbers of blobs with larger overall blob size are constructed, which takes advantage of optimized load balancing for such file sizes in systems, as well as lesser numbers of write operations that leads to high performance on data load.

The blobs herein have an additional metadata section which is written along with the rowgroup data and stored as part of the file footer. The metadata section includes table schema, encryption information, physical metadata, and/or the like, for rowgroup and segments, which makes blobs be self-describing and understandable for other systems to consume independently.

Each single segment is encrypted independently, so it can be easily accessed and decrypted from blobs herein by using start position and length which are stored as part of segment metadata in the metadata section. With this supportability, embodiments enable efficient scans of only a subset of the columns while reading the data without scanning entire blob.

To endorse the table schema alteration described, blobs herein follow an optimized append-only mechanism which is different than other open-source immutable columnar data formats. As a column is added or altered, a new column segment data is appended to the end of the file along with a new footer. The metadata section in the new footer contains the super set of metadata of all physical columns and segment in the files, which supports point-in-time queries to access historical column data from previous versions of table schema.

The design and methods for embodiments herein support high data load performance, and the unique and extendable file format makes blobs self-describing as well as supports efficient columnar data access. Append-only storage supports table schema alteration and keeps changed/deleted columnar data in file which allows accessing historical data at any point. In embodiments, appends are not logged by the system.

Accordingly, embodiments herein enable a data warehouse system to provide snapshot level consistency for data versions to all user transactions and support cross database and cross-compute pool transactions, as well as access to the same table by multiple compute pools via global metadata. Further, systems that utilize the described embodiments reduce operational complexity, reduce intra-system communications, enable no-lock reads/scans of data, and provide immediate and reliable rollbacks of data, in addition to further advantages provided herein. For instance, through versioning semantics and append-only storage of both rows in rowgroups and metadata, the embodiments herein enable lock-free scans for read-only queries, instant data rollback across the distributed system responsive to aborts, reliable and single-phase commits across the distributed system, point-in-time queries with optimized visibility lists on data and metadata, the ability to forego tracking specific information for read-only queries, and the ability to forego maintaining commit tables on clients/nodes where on-the-fly active/abort lists guarantee snapshot behavior. Additionally, rowgroups are stored as flat data structures that provide additional operational efficiencies and simplification thereof, and self-describing files allow access thereto for other related, and unrelated, systems.

Accordingly, the embodiments herein provide for solutions to issues with data versioning in databases through unique versioning semantics, and issues with system scalability for storage through a unique storage of data rows, associated metadata, and global metadata. These and other embodiments will be described in further detail below in this Section, in association with the Figures, and in Sections/Subsections that follow.

Systems, devices, and apparatuses herein may be configured in various ways for rowgroup consolidation with delta accumulation and versioning, such as data warehouses that maintain large databases. For instance, FIG. 1 will now be described. FIG. 1 shows a block diagram of a system 100 that is configured for rowgroup consolidation with delta accumulation and versioning, according to example embodiments.

As shown in FIG. 1, system 100 includes a user device 102 and a data warehouse 104. In embodiments, user device 102 and data warehouse 104 communicate with each other over a network 112. It should be noted that in various embodiments different numbers of user devices and/or data warehouses, and/or subcomponents thereof, are present. Additionally, according to embodiments, any combination of the systems and/or components illustrated in FIG. 1 are present in system 100.

Network 112 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for interacting with a database, data warehouse, and/or database server, such as providing queries against tables/data sets. User device 102 also includes additional components (not shown for brevity and illustrative clarity) including, but not limited to, components and subcomponents of other devices and/or systems herein, in embodiments. In some embodiments, user device 102 may comprise a computing device/system hosting a service or application that provides queries against tables/data sets.

Data warehouse 104 comprises one or more server computers, computing systems, and/or computing devices, which may include one or more distributed or "cloud-based" servers in embodiments. Data warehouse 104 may comprise one or more on-premises servers in addition to, or in lieu of, cloud-based servers, in different implementations contemplated herein. Various systems/devices herein, such as data warehouse 104, are configured to provide services utilized by user device 102, such as business services and/or applications involving data warehousing, database hosting, and/or or like. For instance, data warehouse 104 includes one or more compute pool(s) 108 that may each include, without limitation, a control node, a DQP, one or more compute nodes, and/or the like, as described herein. Data warehouse 104 also includes a transaction manager node 110 associated with compute pool(s) 108, as well as additional components configured to perform functions for rowgroup consolidation with delta accumulation and versioning, as described in further detail herein, and one or more data sets 106 ("data sets 106" hereinafter).

Data sets 106 include databases and/or the like that comprise tables of data, in embodiments, which may be very large data sets such as for "Big Data" analytics and/or data warehousing. It is contemplated herein that one or more of data sets 106 are to the order of petabytes, or more, in embodiments. Data sets 106 may include any type of data, including relational data, organized as tables having columns for the data.

As noted above, compute pool(s) 108 may include a control node that comprises one or more server computers, server systems, and/or computing devices, such as an on-premises server(s) in addition to, or in lieu of, cloud-based servers. A control node may include an instance of a database server application and is configured to act as the query endpoint for incoming queries, to produce a distributed plan for an incoming query in conjunction with a DQP. In embodiments, a compute node and a DQP may be logically and/or physically separate, or combined in whole/part. The distributed query plan divides work for query processing among compute nodes of compute pool(s) 108. That is, according to embodiments, a control node and a DQP are configured to receive and transform an incoming query into a set of queries that are run against distributions of a data set, e.g., in parallel, via the compute nodes.

Compute nodes may each comprise one or more server computers, server systems, and/or computing devices, such as an on-premises server(s) in addition to, or in lieu of, cloud-based servers. Compute nodes may also each include an instance of a database server application, and are configured to read and/or process data from one or more distributions of large tables in performance of query execution tasks as distributed by the control node/DQP. Compute nodes may also each include a cache to locally store rows of a table for operations of transactions thereon. In embodiments, a blob may also be locally cached based at least on a node reading the blob, and cached blobs may be maintained locally for faster access thereto as needed. In embodiments herein, compute nodes 110 are configured to perform functions and/or operations in accordance with rowgroup consolidation with delta accumulation and versioning, including transactions based at least on versioning, heartbeat communications, distributed abort functions, etc.

Transaction manager node 110 is configured to drive versioning and semantics for isolation-based query transactions in distributed systems in the described embodiments for rowgroup consolidation with delta accumulation and versioning. For example, transaction manager node 110 is configured to version, or uniquely identify, incoming queries that alter or modify data (i.e., queries that are not read-only) and data that is altered/modified by such queries. Transaction manager node 110 is also configured to supervise and maintain active, commit, and abort information for such queries. These and additional details regarding transaction manager node 110 are described in further detail below.

As noted above, data warehouse 104 includes one or more distributed or "cloud-based" servers, in embodiments. That is, data warehouse 104 may be a network, or "cloud," implementation for applications and/or services associated with hosting databases and/or data warehousing in a network architecture/cloud platform. A cloud platform includes a networked set of computing resources, including servers, routers, etc., that are configurable, shareable, provide data security, and are accessible over a network such as the Internet, according to embodiments. Cloud applications/services for hosting databases and/or data warehousing are configured to run on these computing resources, often atop operating systems that run on the resources, for entities that access the applications/services, locally and/or over the network. A cloud platform is configured to support multi-tenancy as noted above, where cloud platform-based software services multiple tenants, with each tenant including one or more users who share common access to certain software services and applications of the cloud platform, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

While a data warehouse (e.g., data warehouse 104) is shown in system 100 for non-limiting purposes of description and illustration, in various embodiments, alternate implementations for database hosting are also contemplated herein.

Referring now to FIG. 2, a block diagram of a system 200 is shown for rowgroup consolidation with delta accumulation and versioning, according to an example embodiment. System 200 as exemplarily illustrated and described is configured to be an embodiment of data warehouse 104 of system 100 in FIG. 1. That is, system 200 is illustrated as being configured to perform operations of a data warehouse based at least on the techniques described herein. System 200 is described as follows.

System 200 includes a computing system 202 which is any type of server or computing system, as mentioned elsewhere herein, or as otherwise known, including without limitation cloud-based systems, on-premises servers, distributed network architectures, a data warehouse or portions thereof, and/or the like. As shown in FIG. 2, computing system 202 includes one or more processors ("processor") 204, one or more of a memory and/or other physical storage device ("memory") 206, as well as one or more network interfaces ("network interface") 234. Computing system 202 also includes a compute pool(s) 208 (which may be any number of compute pools, and which may be virtual data warehouse instances of a data warehouse system in embodiments), a transaction manager node 216, a rowgroup consolidation manager 226, a global metadata manager 228, a global clustered columnstore index ("CCI") delta manager 230, and a delete manager 232. Also illustrated for system 200 is data set(s) 224, which may be an embodiment of data set(s) 106 of FIG. 1 and may include one or more user tables of user data against which transactions of queries are performed. While not shown for brevity and illustrative clarity, system 200 may also include a garbage collector, a lock manager service, and/or the like, as would be understood by persons of skill in the relevant art(s) having the benefit of this disclosure.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache(s), temporary database memory, etc., for versioning and/or query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of compute pool(s) 208, transaction manager node 216, rowgroup consolidation manager 226, global metadata manager 228, global CCI delta manager 230, and delete manager 232, including one or more of the components thereof as described herein, which may be implemented as computer program instructions, or alternative as hardware, as described herein, and stored in memory 206.

Memory 206 includes volatile storage portions such as a random access memory (RAM) and/or persistent storage portions such as hard drives, non-volatile RAM, caches, and/or the like, to store or be configured to store computer program instructions/code for rowgroup consolidation with delta accumulation and versioning as described herein, as well as to store other information and data described in this disclosure including, without limitation, data sets, tables of information associated with queries, indexes, lists or tables of data version information, different types of metadata (including but not limited to global metadata types), and/or the like, in different embodiments. For instance, computing system 202 also includes a transaction history 218 and data set(s) 224 which may be stored in memory 206, e.g., as on-disk storage, in caches of systems and/or components described herein, and/or the like. In embodiments, such data, types of metadata, and/or information may be stored in a storage external to computing system 202, and may be available for sharing/use by computing system 202 and/or other systems (e.g., multiple pools of compute/processing nodes, external systems, as described herein, etc.) via a network or storage interface. Memory 206 may comprise internal and/or external portions in embodiments.

Network interface 234 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100 in FIG. 1, including systems that store data sets, user devices, compute nodes, and/or the like, over a network such as network 112.

System 200 also includes additional components (not shown for brevity and illustrative clarity) including, but not limited to, components and subcomponents of other devices and/or systems herein, as well as those described below with respect to FIG. 10, according to embodiments.

Compute pool(s) 208 may be an embodiment of compute pool(s) 108 in FIG. 1, as described above. In the illustrated embodiment, compute pool(s) 208 includes a control node 210, a distributed query processor (DQP) 212, and one or more compute node(s) 214, although embodiments contemplate different numbers of one or more of these components in various implementations. Likewise, one or more of compute pool(s) 208 may be present computing system 202.

Control node 210 may comprise any database server application, in addition to processors and memory described above, and operate as a front end, or a query endpoint, in embodiments, that receives queries from user devices, services, applications, and/or the like. Control node 210 may include a data definition language (DDL) engine and a query optimizer, in embodiments. A DDL engine is configured to execute statements to create, modify, and delete tables, indexes, and relationships in a data set, e.g., based at least on an incoming query. In embodiments, a DDL engine is configured to execute statements to create, modify, and/or delete rows in tables, tables themselves, lists, arrays, and/or other data structures that are generated in performance of the query transactions. A query optimizer is configured to generate query plans for execution of incoming queries against tables, data sets, etc. based at least on the incoming queries and other information, e.g., cardinality estimates, etc. To begin query execution, control node 210 may communicate with transaction manager node 216 and provide information associated with a query (e.g., an API call responsive to receiving the query) such that transaction manager node 216 is enabled to assign a transaction start identifier (i.e., a begin sequence number) for the query and to generate a token as further described herein.

DQP 212 may include subcomponents such as a deserializer, a Directed Acyclic Graph (DAG) generator, a workload manager, and/or the like in embodiments, and may be configured to orchestrate a query task DAG across large numbers, e.g., thousands, of compute nodes at petabyte-scale reliably. A deserializer is configured to deserialize requests for distributed query processing on data set distributions, received from control node 210, and to provide its output to the DAG generator which in turn is configured to generate a DAG, such as a static DAG that outlines process dependencies and operations for performing distributed execution of query tasks/transactions. DAGs are provided from the DAG generator to the workload manager which is configured to assign ones of compute node(s) 214 to perform the distributed query tasks/transactions in accordance with the embodiments herein for rowgroup consolidation with delta accumulation and versioning.

Control node 210 may be a logically or physically separate entity from other components of computing system 202, and DQP 212 may be a logically or physically separate entity from other components of computing system 202. For example, in some embodiments, control node 210 and DQP 212 may be implemented in different physical or logical server hosts that are communicably linked for performance of rowgroup consolidation with delta accumulation and versioning. In such embodiments, DQP 212 may comprise a separate server node while control node 210 comprises its own server.

Compute node(s) 214 may comprise any database server application, in addition to processors and memory described above, and operate as a back end, in embodiments, that receives portions of distributed query tasks/transactions from control node 210 and/or DQP 212. One or more compute node(s) 214 may be present in given embodiments, and each of compute node(s) 214 may include a data definition language (DDL) engine and a query optimizer, in embodiments, as described above. Compute node(s) 214 is configured to operate on specific versions of data in rows, in accordance with rowgroup consolidation with delta accumulation and versioning, as further described herein.

While not shown in FIG. 2 for illustrative clarity, control node 210 and each of compute node(s) 214 may include a local cache, described in further detail below. Each local cache may include rows and/or rowgroups of tables, a list of aborted query transactions utilized to determine appropriate versions of data that are allowed to be visible to active queries/transactions, and/or the like.

Transaction manager node 216 may be an embodiment of transaction manager node 110 in FIG. 1, described above. Transaction manager node 216 is configured to drive the versioning and semantics for isolation-level query transactions in distributed systems in the described embodiments, including but not limited to, providing versions, or unique identifiers to incoming queries that alter or modify data (i.e., queries that are not read-only, or data manipulation language (DML) operations) and data that is altered/modified by such queries, as well as supervising and maintaining active, commit, and abort information for such queries. Transaction manager node 216 is also configured to assign and to use versions for blobs, delta store rows, and DDL operations (i.e., for logical metadata), and/or the like. As illustrated, transaction manager node 216 includes one or more API(s) 228 ("APIs 228" hereinafter), one of which may be a BeginTransaction API to which a call may be made by control node 210, for a received query, in order to acquire a token comprising a unique transaction start identifier of the query, a unique query identifier, an active queries/transactions list, and a partial abort list, as described herein. In embodiments, the transaction start identifier (ID) acts as a query begin sequence number, for queries that are not read-only, that temporally associates the received query with prior queries (e.g., sequentially with respect to time). The query ID (QID) for a query that modifies or alters data may be the same as its transaction start ID. It should be noted that read-only queries may be assigned a "NULL" transaction start ID as these queries are not tracked by transaction manager node 216, in embodiments, but read-only queries are assigned a QID. In embodiments, a QID for a read-only query/transaction may be associated with the system active queries/transactions list, as described in further detail below. The transaction start IDs and QIDs (in addition to commit and abort IDs described herein) for queries in the system are assigned by transaction manager node 216 based at least on a global versioning variable counter 220 ("global counter 220" or "counter 220") that increments to maintain uniqueness for different queries/transactions according to snapshot isolation (or RCSI, in alternate embodiments). Global counter 220 may any type of incrementing counter, such as an integer counter, an unsigned integer counter, and/or the like, that may be of any length. Queries are thus enabled to filter out rows based at least on the version semantics described herein. The novel format of versioning described herein allows an architecture based at least on embodiments to share versioning across databases, compute pools, data warehouses, etc., to support multiple Read/Write databases.

Transaction manager node 216 enables transaction visibility to be implicit via the versioning semantics to be used for reads performed in query transactions to verify the correct data versions are read. To further enable support a common version store, transaction manager node 216 is configured to write versioning information to transaction logs, in transaction history 218, which may include commit or abort history information, and which may be on-disk information in embodiments. Additionally, APIs 218 may support transactions in the overall system and may be implemented to access the information maintained by transaction manager node 216 in a cache thereof and/or in transaction history 218. For example, APIs 228 may also include APIs to commit and/or flush transactions, abort transactions, get a transaction state, get a list of queries with a specified type, and/or the like. That is, transaction manager node 216 is configured and enabled to be contacted by control nodes and compute nodes in a data warehouse to allow access to real-time, or near real-time, changes to transaction status and data happening in the system. Accordingly, there is little if any delay in the distributed systems herein for supporting version semantics of isolation-level query transactions.

While not shown in FIG. 2 for illustrative clarity, transaction manager node 216 may include one or more local caches, which may be globally-unique and/or accessible, in the system.

It is also contemplated herein that one or more of control node 210, DQP 212, and/or compute node(s) 214 may include an API(s) similar or equivalent to APIs 228 in order to access/receive information of transaction manager node 216, as well as to perform operations such as commits, aborts, and/or the like. That is, calls to APIs 228 described herein are not limiting and embodiments include alternate calls from other APIs of components in system 200 that perform the same, or substantially the same, operations.

Rowgroup consolidation manager 226 is configured to generate consolidated rowgroups as described herein. Global metadata manager 228 is configured to generate and store global metadata as described herein. Global CCI delta manager 230 is configured to manage rowgroups of delta stores as described herein. Delete manager 232 is configured to manage delete files, e.g., by compression or deletion thereof.

In embodiments, while shown separately for illustrative clarity and description, one or more of rowgroup consolidation manager 226, global metadata manager 228, global CCI delta manager 230, and/or delete manager 232 may be implemented as a service of system 200, as a portion of one or more components described in system 200 (e.g., transaction manager 216, control node 210, etc.), as individual nodes comprising processing and memory resources in system 200, and/or the like, and are not limited to the illustrated embodiment.

Further details regarding the operations and configurations of rowgroup consolidation manager 226, global metadata manager 228, global CCI delta manager 230, and delete manager 232 are provided in the embodiments herein, including those shown in the instant Figures and discussed in their associated descriptions.

FIG. 3 shows a flowchart 300 for rowgroup consolidation with delta accumulation and versioning, in accordance with an example embodiment. Further structural and operational examples will be apparent to persons skilled in the relevant art(s) based at least on the following descriptions. Flowchart 300 is described as follows with respect to system 200 of FIG. 2.

Flowchart 300 begins at step 302. In step 302, data/row modifying transactions are performed for tables of data in which pre-modified and modified data/rows are maintained in rowgroups of local and global blob data structures as uncompressed versioned entries that are appended to the rowgroups. For instance, as described above, computing system 202 of system 200 in FIG. 2 is configured to perform distributed execution, over one or more compute pools, of queries against a database, or databases, based at least on isolation-level query transactions in which a single transaction manager node drives data versioning and for which rowgroup consolidation with delta accumulation via append-only storage and global metadata is performed by rowgroup consolidation manager 226, global metadata manager 228, global CCI delta manager 230 and/or delete manager 232. Further details regarding such performance are provided below with respect to FIGS. 4-9 and their associated descriptions.

In step 304, globally-accessible metadata is maintained for open rowgroups that specifies updates, provides rowgroup size, maps logical row locations to physical row locations, and tracks deleted row information. For example, as described above, computing system 202 of system 200 in FIG. 2 is enabled and configured to utilize compute pools to perform distributed query transactions. When such transactions modify data in a row of a table, e.g., insert, update, and/or delete operations, globally-accessible metadata is generated and maintained for open rowgroups, e.g., by global metadata manager 228, which specifies updates of rowgroups in which rows modified, provides rowgroup sizes maps logical row locations to physical row locations, and/or tracks deleted row information, in various embodiments, while adhering to versioning semantics for isolation-level query transactions. Further details regarding such performance are provided below with respect to FIGS. 4-9 and their associated descriptions.

As noted herein, blob files are generated and maintained to be self-describing. Accordingly, blob files herein may include partial columnstore metadata with a binary type that is inserted into the blob files. For compressed blobs, e.g., rowgroup consolidated blobs, these files may be stored in user storage of the users that owns the data set associated with the compressed blobs. The blob may be divided into three parts, in embodiments: a column store data section, a metadata section, and a blob footer, which makes the blob self-contained and self-describing.

Example details regarding rowgroup consolidated blobs are now described. Each rowgroup consolidated blob may contain a single compressed row group data and metadata, in embodiments, while have multiple rowgroups stored into a single blob via append-only mechanisms are also contemplated. The metadata is stored after the data section, as some segment/dictionary properties (e.g., on-disk size, encryption status, rowgroup closed time) are generated after data serializing, which enables flushing the data as soon as a maximum input/output ("I/O") limit is reached to free memory quickly. For similar reasons, a footer storage technique is used instead of a header technique that lacks a known, or given, location (i.e., an end of the file) as headers must be scanned/traversed to locate information therein. Columnar data is stored continuously, according to embodiments, and row group data may be consolidated and ordered by the column position.

The metadata section in the footer of the blobs includes the physical metadata and table schema from one or more system tables/files for a given compressed rowgroup. Some system tables/files may only be persisted into the rowgroup consolidated blobs instead of physical metadata. During database ("DB") start up, or during on demand rowgroups/rowset data access, physical metadata may be read for the given rowgroup consolidated blob's metadata (e.g., rowgroup consolidated blobs for a given cell) and populated into a metadata cache and in-memory column store attribute cache. For some system tables/files, metadata is also stored in the rowgroup consolidated blob properties which will be used for quick filtering. In some embodiments, rowgroup consolidated metadata may be accessed directly via a stamped metadata offset without checking the blob footer, and still other system tables/files are used for describing the table schema, rowgroup statistics, and compression information.

All metadata persisted to blobs is physical metadata, in embodiments, where any logical metadata (e.g., column name, table name, etc.) may not be stored as it can be easily changed—this may avoid blob modifications in such scenarios and simplify the embodiments herein while increasing processing efficiency, e.g., by reducing processor cycles and memory footprint. Embodiments herein provide for different types of metadata elements, such as but without limitation, Segment Metadata, Dictionary Metadata, Column metadata, and Row group metadata, although other types of metadata elements, e.g., Rowgroup stats, partition stats, etc., are also contemplated herein. All the metadata in the blob may be cached in metadata cache DBs (e.g., segments, dictionaries, groups) in a first cold scan of the system, thus, the next scan is not required to read the metadata section to get the column segment/dictionary data file offset; rather, this may be found in the cached metadata table.

Regarding metadata versions, each element may have its own metadata version, and if any sub metadata is changed (e.g., adding a field, changing type, etc.), the version number may be increased, e.g., incremented. Before storing the actual metadata elements for each type (segment, dictionary, column, and row group), a metadata header may be included which contains the number of elements, the size of each element, the element version, and/or the like. The deserializer may then read the header of this portion first, then parse each type of the elements. In embodiments, it is possible that the metadata version that was stored in the header no longer exists in the current code package (e.g., a train rollback scenario). In this case, the last metadata version in the current code package may be selected to deserialize the input buffer. The metadata version in the header has to be greater than the current latest version, in embodiments, as the version can only be increased, and embodiments herein adhere to an append-only structure version update. And because the metadata element size is linked to the metadata element version, the metadata element size is also stored into the header in case the serialized version has been rolled back. This allows the use of the metadata size from the header as the actual reference to jump to the next element.

Column metadata may include the column base on the physical column position order and a list of Row Group Metadata. A Physical Column Identifier ("ID") may start from '2', or a second available ID, as the first column for a columnstore may be reserved for the original locator column. Rowgroup metadata may include the physical row group ID within a cell, which reflects the global row group position in the entire cell (e.g., as composed by multiple blob files). Row count and rowgroup size may be stored in this metadata object as well.

Column Store Object Metadata may reflect all the metadata used for a single column store segment including start position in the file and total length. If there is a local dictionary for a segment, the dictionary related metadata may be stored with the segment's metadata as well. For each row group, the segments data may be stored before the local dictionaries data. In embodiments, shared dictionaries may be disabled. In embodiments, column segment metadata and dictionary metadata may only be stored in the rowgroup consolidated files instead of physical metadata service.

With respect to the blob footer, at the end of the file, there may be included a fixed-size blob footer information section which comprises the footer version and the footer size. If any additional information is added to the footer, the version and correct the footer size may be updated. The blob format version, which may have a default version, e.g., '1', is increased each time the file format is updated. A reading entity may thus be required to know how to parse a given blob based at least on the version.

A minimum transaction version/ID is the earliest or oldest transaction version of the rows in the blob. Embodiments herein maintain consistency across versions following the version semantics dictated by the transaction manager. Each row in a blob may have its own corresponding transaction version/ID which is stored in an additional column in a row group (e.g., in both the delta store and the column store, for a compressed row group it is an additional segment). When data directly lands in the column store during a bulk insert, all rows in a compressed row group may have the same version. If the row group lands in the delta store first, each row may have a different version. The minimum of these is selected and stored it in the footer.

When a scan is performed to read data in one or more rows, it compares the current available version/ID and the minimum transaction version/ID in the header. If the min txt version is less than, or older than, the current available version, this means there is at least one a row in the blob that is available for the reader. Otherwise the reader may skip this blob. In embodiments, such determinations may be joined with a check of the active transaction list as well to ensure valid data visibility. In embodiments, a flag, marker, or variable to indicate whether all the rows in the rowgroup file are inserted in the same transaction or not may be implemented. For those directly compressed rowgroups from a bulk insert, this indicator is set to be "true" or a corresponding equivalent. When "true," a scan compares its current available version with minimum transaction version/ID without decompressing the version column segment to check versions of every row.

A metadata offset may also be implemented, according to embodiments, which points to the position of the metadata in the blob. To scan a segment, the metadata section is read first to get the offset and metadata of a segment. Then the actual segment data may be read based at least on the offset. To avoid additional I/O operations for getting the metadata offset from a header, the metadata offset may be stored in a physical catalog file.

A blob may be dropped when a corresponding rowgroup has been dropped. For example, according to embodiments, if a single segment in a rowgroup is deleted, the corresponding blob may not be deleted. A blob to be dropped may be marked in a dropped table when a rowgroup thereof is dropped. Dropping a column may be a metadata operation only, in embodiments, while the segment and dictionary may be removed from system tables/files. Rebuilds of indexes or tuple mover operations may generate new rowgroup consolidated blobs without dropped column segments.

For DDL operation to add columns, the column segments generation is not required, in embodiments. Accordingly, a flag or other indicator may be set in the column attributes to indicate this column is newly-added without column segments generation. For scan/read operations, prior to rowgroup access, the column segment version IDs are checked to determine whether the current rowgroup qualifies for filtering. When reading the rowgroup data, the default value/null value may be read instead of segments by introducing a new column type and following the same data decoding path as a regular column store.

Adding a column may be a metadata operation, in embodiments, and a default value may be set in the table schema. The column store may generate a new segment, however, for each rowgroup when altering an existing column to a CCI table. In embodiments, altering a column adds a new physical column by converting existing column data to a new data type and dropping the old data type column. As an example, if the user table has two columns, C1 and C2, there is a logical to physical column ID mapping maintained in metadata.

TABLE 1

| User Table | C1 (Int) | C2 (Char) |
|---|---|---|
| Logical column id | 1 | 2 |
| Physical column id | 1 | 2 |

When a user runs the alter column update, to change the C1 type from Int to Float, a new physical column with ID 3 is added with same the data as C1(Int) but with the Float type, and the logical to physical column ID mapping is updated so that the logical column ID 1 maps to the physical column ID 3. Then the physical column with column ID 1 is dropped.

TABLE 2

| User Table | C1 (Int) | C2 (Char) | C1 (Float) |
|---|---|---|---|
| Logical column id | 1 | 2 | 1 |
| Physical column id | 1 | 2 | 3 |
| Operation | Drop | | Add |

The alter column operation is different with the add column as the existing table already has values therefor. During the DDL operation, each tuple may be check to determine whether its value is compatible to the new data type and the operation may fail for the alter transaction if any conversion error is encountered.

Embodiments may not allow for overwrites of existing rowgroup consolidated blobs as the old segments data are maintained for a period of time to support point-in-time transactions. For example, in the above case, column segments for physical columns 1, 2, and 3 are each maintained. Various embodiments may thus provide implementations to account for this requirement, e.g., appending to existing blobs or re-writing blobs.

To append to existing rowgroup consolidated blobs, the existing rowgroup consolidated blob is opened and the rowgroup consolidated blobs metadata is loaded into memory. The newly-created column segment is appended to the existing rowgroup consolidated blob, and the rowgroup consolidated file metadata is re-generated and appended to the end of the blob. The metadata will contain the superset of the physical column information, and the metadata start offset and blob size are updated in the physical metadata (blob properties).

If an alter transaction commit is performed, the new column mapping should also be available, e.g., the segment and dictionary data of column 3 is read from the rowgroup consolidated blob.

TABLE 3

| User Table | C1 (Int) |
|---|---|
| Logical column id | 1 |
| Physical column id | 3 |

If the alter column transaction gets rolled back, the old column mapping is used, and the segment and dictionary data of column 1 is read from the rowgroup consolidated blob.

TABLE 4

| User Table | C1 (Int) |
|---|---|
| Logical column id | 1 |
| Physical column id | 1 |

As noted, embodiments provide for regenerating/writing blob metadata at the bottom of the file, and blobs may not be immutable. Additionally, the physical metadata in the blob properties is updated to reflect the new metadata location and blob size, a tuple mover may be blocked during the append operation to avoid touching the file together. To support the append semantic described above for existing block blobs, embodiments call for getting a committed block list when opening existing blobs with a generic write access flag in a block blob access API. Then, the next flush will commit the newly-added block as well as previously committed blocks.

Regarding the rewrite of a new rowgroup consolidated blob, the existing segments data is copied with the new altered column segment into another rowgroup consolidated blob. The column segment for physical column 1 (i.e., the dropped column) may be kept in the new rowgroup consolidated blob. The blob metadata may then be regenerated and appended to the new rowgroup consolidated blob, and the new blob information (e.g., blob ID, container ID, metadata offset, blob size, etc.) is updated for the compressed rowgroup in the physical metadata. Finally, the stale blob may be dropped as the new rowgroup consolidated blob contains old segment metadata and data as well—the old blob may be immediately dropped without keeping it to support pint-in-time transactions.

This enables a clean operation and keeps the blob immutable logic, and because the blob will be immutable, the tuple mover and restore services are enabled to touch the rowgroup consolidated blob without acquiring locks.

Figure 5:
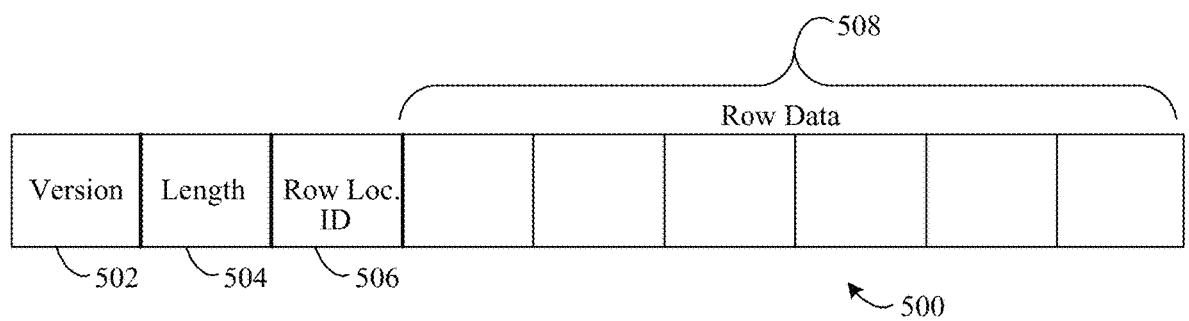
FIG. 5 shows a block diagram of a row data structure for rowgroup consolidation with delta accumulation and versioning in distributed systems, in accordance with an example embodiment.
Figure 6:
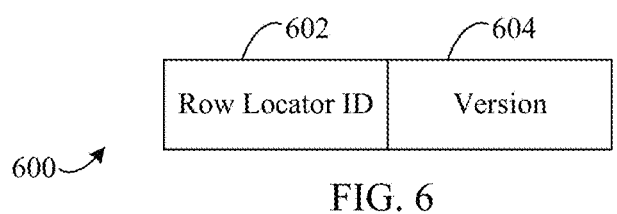
FIG. 6 shows a block diagram of a delete file data structure for rowgroup consolidation with delta accumulation and versioning in distributed systems, in accordance with an example embodiment.
Figure 7:
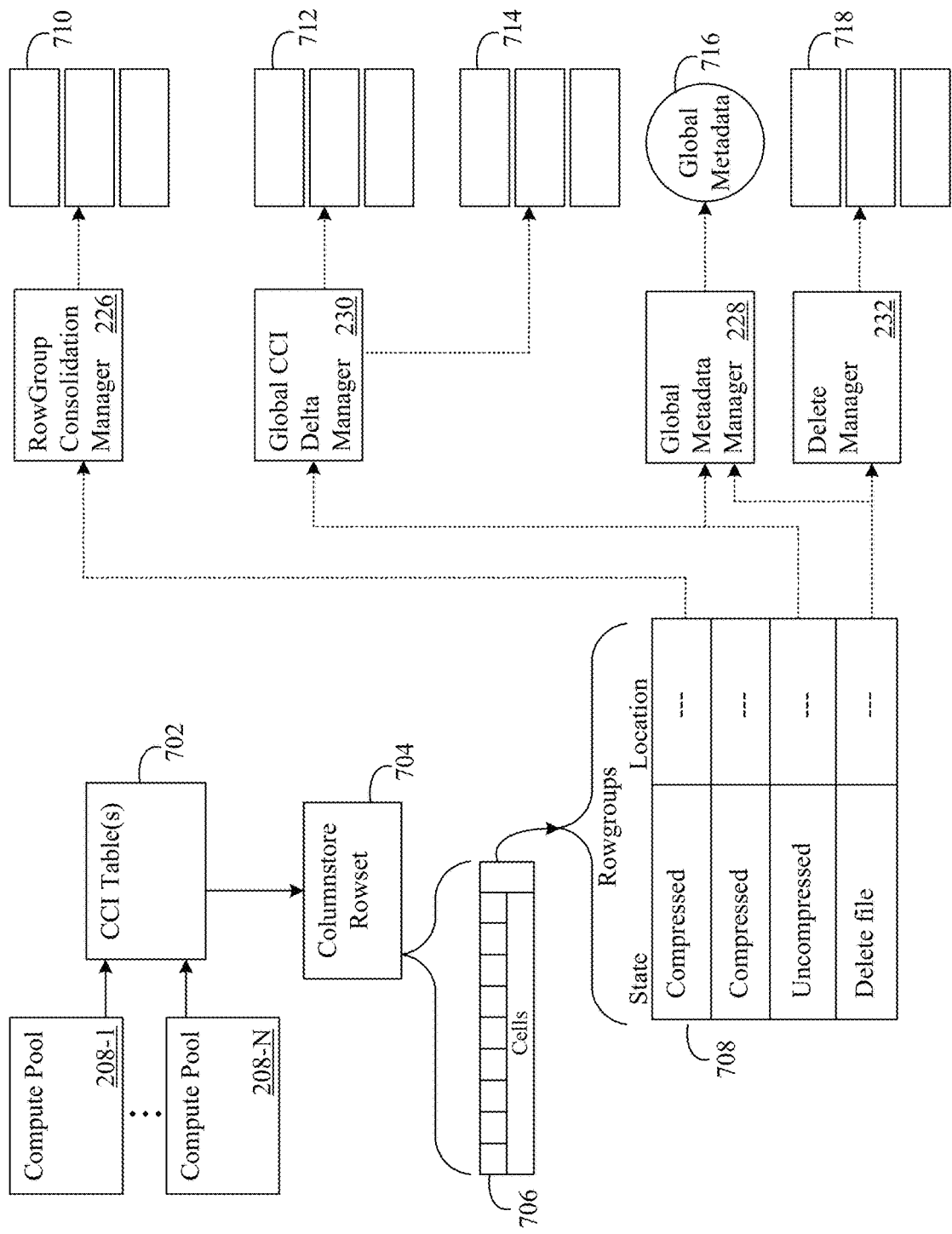
FIG. 7 shows a flow diagram for rowgroup consolidation with delta accumulation and versioning in distributed systems, in accordance with an example embodiment.

FIG. 4, FIG. 5, FIG. 6, and FIG. 7, each of which are for rowgroup consolidation with delta accumulation and versioning, will now be described with reference to each other in the context of the description above. FIG. 4 shows a block diagram of an open blobs (binary large object) 400 for rowgroup consolidation with delta accumulation and versioning in distributed systems, in accordance with an example embodiment, FIG. 5 shows a block diagram of a row 500 for rowgroup consolidation with delta accumulation and versioning in distributed systems, in accordance with an example embodiment, and FIG. 6 shows a block diagram of a delete file 600 for rowgroup consolidation with delta accumulation and versioning in distributed systems, in accordance with an example embodiment. FIG. 7 conceptually shows a flow diagram 700 of a distributed system for rowgroup consolidation with delta accumulation and version. Further structural and operational examples will be apparent to persons skilled in the relevant art(s) based at least on the following descriptions. FIG. 4, FIG. 5, FIG. 6, and FIG. 7 are described below, also with respect to system 200 of FIG. 2.

The dispersion of core database server components into separate, scalable entities is enabled according to embodiments which provide for the dispersion of a CCI delta storage into a highly scalable architecture that is also highly accessible, and fits in within versioning architectures noted herein Existing solutions load data into a CCI table, store them as compressed rowgroups, or, if there are not enough rows to efficiently compress a rowgroup, store them as uncompressed rowgroups in a delta store, where this delta store is local to a distribution DB. However, embodiments provide non-localized and global access to these uncompressed rowgroups, so that multiple data warehouses, compute pools, etc., are enabled to read and write to them, while also supporting desired versioning schemes. That is, multiple virtual data warehouse instances or compute pools logically access the same user table. They do this by accessing the same global metadata storage entity that includes global metadata that maps logical tables to their physical rowgroup locations as managed by global metadata manager 228. The compressed rowgroups are stored in user storage accounts via rowgroup consolidation manager 226, and the uncompressed rowgroups are maintained in delta storage that is managed by global CCI delta manager 230. Accordingly, globally accessible uncompressed rowgroup storage is enabled, systems are scalable to the point of servicing requests from thousands of computes spanning multiple virtual data warehouse instances or compute pools, performant access to uncompressed rowgroup operations is enabled, systems support one Read/Write cluster and multiple Read-Only clusters, consistency across data versions is maintained by following the version semantics dictated by the transaction manager node 216, and each uncompressed rowgroup is self-contained and self-describing. These advantages are further enabled via the use of append-only mechanism, as described herein, for blobs.

Turning now to FIG. 4, open rowgroup blobs (binary large object) 400 (also "blobs 400" herein) is shown. In the illustrated embodiment, blobs 400 is a block blob, although embodiments are not so limited (e.g., page blobs may be used in alternate implementations). Each new entry for open rowgroup blobs 400 is appended to this blob in the form of a block, or blocks, therein based at least on size of the data. For example, as illustrated, a block blob 402 of blobs 400 includes blocks 406. Blocks 406 are illustrated as five blocks: a first block for row 1 (which may be appended with a single operation), a second and third block for row 2 (which may be appended with two operations, e.g., based on the size of data in row 2), a fourth block for row 3, a fifth block for row 4, etc. Blobs 400 may include various numbers of blobs, e.g., as illustrated for additional block blob 404 that may comprise additional bocks of blobs 400.

As noted herein, embodiments provide for append-only storage of new rows for rowgroups, and this mechanism is linked to versioning of rows as described herein. Versioning requirements may include, but are not limited to, the following: previous versions can be read until they are garbage collected, and only the latest version can be updated/deleted. To ensure the above semantics are always valid, embodiments herein provide for global CCI delta manager 230 to follow an append-only behavior when adding rows to rowgroups in the delta store, thus allowing previous versions to be untouched by newer version changes. Such behavior results in the following workflows. First, regarding the insertion of rows into a rowgroup, a row is appended into a blob. Second, to delete rows, a delete record is appended in a delete bitmap/file. Third, to update existing rows, an insert of a new row is performed by appending the new row into the blob with the updated field(s), then the previous row is deleted, and the update workflow in essence relies on the two workflows described above. That is, an update to an existing row does not actually delete the row, but rather appends a delete record in the delete bitmap/file and inserts a new row having the updated information.

Each of these appends are versioned, thus allowing a scan to read the version it desires. A scan is required to be able to filter out newer versions by determining whether a given version committed before it or not. The subset of entries that are remaining form the delta store for the given version. However, only the rows that have not been marked for delete in the delete bitmap are valid rows. Accordingly, row-level versioning is provided by the embodiments herein.

Referring now to FIG. 5, a row 500 is shown. Row 500 may be a row that is appended into an open rowgroup of a blob, e.g., as shown in FIG. 4. Row 500, as illustrated, includes a version field 502, a length field 504, a row locator ID field 506, and row data 508. From the above description of row 500, it can be seen that based at least on the version, a scanner need only be concerned with the row if the version is visible for a scan, and the length of the record is readily determinable based at least on the length field.

Referring now to FIG. 6, a delete file 600 is shown. As embodiments may not allow in-place updates and deletes, a delete bitmap/file for open rowgroups is provided herein. The delete bitmaps/files are also versioned consistently with the rows and transactions that modify them. Delete file 600 illustrates an example delete file, which may be a bitmap, a text document, etc., in different embodiments. As shown, delete file includes a row locator ID 602 that corresponds to the row locator ID field 506 in row 500 of FIG. 5, and includes a version ID 604 of the transaction that deleted the row. In embodiments, delete file 600 may also comprise a rowgroup in and of itself, as described herein. It is also contemplated herein that a delete file may be maintained by each cell of a user table, or that a delete file may be kept by each cell for compressed rows while each open rowgroup maintains a delete file.

To read in an open rowgroup from a blob, according to embodiments, the blob is scanned to view all the rows therein. However, depending on the scan version, the scanner may be able to 'see' all the rows. That is, for each row, it may be determined if the row was committed before the scan started, and/or if the row marked as deleted. To determine if a row was deleted, delete file 600 is utilized, but again, the same principle is applied for delete file 600 to determine if the delete was committed before the scan started. In embodiments, API(s) 222 of transaction manager node 216 in FIG. 2 may include a visibility API to ensure that each row, whether it is in delete file 600 or in the open rowgroup, e.g., in row 500 of FIG. 5, is visible to the scan. The subset of the data remaining from the blob will form the visible open rowgroup.

It should also be noted again here that the change in access patterns provided according to embodiments may not allow in-place updates and deletes. Thus, an update is simply an append insertion to delete file 600 so that the pre-deletion record maintained. This allows for embodiments to utilize a flat structure for data rather than a more complex and computationally inefficient B-Tree implementation.

In summary, a delete workflow is an append operation to delete file 600 that does not alter the pre-delete, associated row, e.g., as row 500 in FIG. 5, of an open rowgroup in the blob, e.g., as open rowgroup blob 400, in embodiments. As implementations herein may not allow concurrent deletes, this append to delete file 600 does not need to concern itself with concurrent writers. And because this operation is essentially an append, it may similarly follow the insert workflow, except this insert is to delete file 600, which may be a specified blob that contains deleted rows, in embodiments.

In FIG. 7, flow diagram 700 is shown with reference to a distributed system that may be an embodiment of system 200 in FIG. 2 in view of FIGS. 4-6 noted above. The illustrated distributed system for flow diagram 700 includes components from system 200. For example, a compute pool 208-1 through a compute pool 208-N (which are embodiments of compute pool(s) 208), rowgroup consolidation manager 226, global metadata manager 228, global CCI delta manager 230, and delete manager 232 are included for flow diagram 700.

Compute pool 208-1 through compute pool 208-N may comprise two or more compute pools in a distributed system as described herein, according to embodiments. Compute pool 208-1 through compute pool 208-N are enabled to access the same data in the illustrated distributed system, i.e., a CCI table 702 via a CCI index as described above. That is, as noted above, embodiments for rowgroup consolidation with delta accumulation and versioning in distributed systems provide for different compute pools to have visibility for, and to perform operations on, the data in the distributed system. For example, database operations that alter data, such as but without limitation, updating rows, deleting rows, inserting rows, and/or the like, may be performed. CCI table 702 may include one or more columnstore rowsets having data, one of which is depicted in flow diagram 700 as columnstore rowset 704 that may include partitions, cells, rowgroups, etc. For illustrative clarity, a single set of cells 706 is shown that includes rowgroups 708. Rowgroups 708 includes data portions that may be files, blobs, etc., that are in compressed or uncompressed states, where uncompressed data portions are considered open, and are eventually compressed as they fill up, become out of data, and/or the like. Rowgroups 708 also includes a delete file, as described herein, which may be any type of file, blob, etc., in embodiments.

Rowgroup consolidation manager 226, global metadata manager 228, global CCI delta manager 230, and delete manager 232 are included for flow diagram 700 to conceptually illustrate rowgroup consolidation with delta accumulation and versioning for the portion of flow diagram 700 described above. For example, rowgroup consolidation manager 226 is configured to compress and store ones of rowgroups 708, including metadata, in a compressed blob 710 that is globally accessible in the distributed system. Global CCI delta manager 230 is configured to store open ones of rowgroups 708 as well as delete files thereof in an open blob 712 and a delete blob 714, respectively, including metadata, which are globally accessible in the distributed system. Similarly, delete manager 232 is configured to store compressed deleted files from rowgroups 708 in a compressed delete blob 718 that is globally accessible in the distributed system. Compressed blobs may be subsequently uncompressed for point-in-time transactions against data therein As described herein, global metadata manager 228 is configured to write metadata for delete files and for rows as they are written (e.g., as uncompressed) to rowgroups 708 in a global metadata store 716 that is globally accessible in the distributed system.

In embodiments, open rowgroups and/or delete files may be cached locally at compute pools, e.g., by a control node, as shown for open blob 712 and delete blob 714, and open and/or compressed rowgroups/delete files may be centrally stored as shown for compressed blob 710 and compressed delete blob 718.

In the context of the description above, including FIGS. 4-7, specific operations that alter data will now be described.

Figure 8:
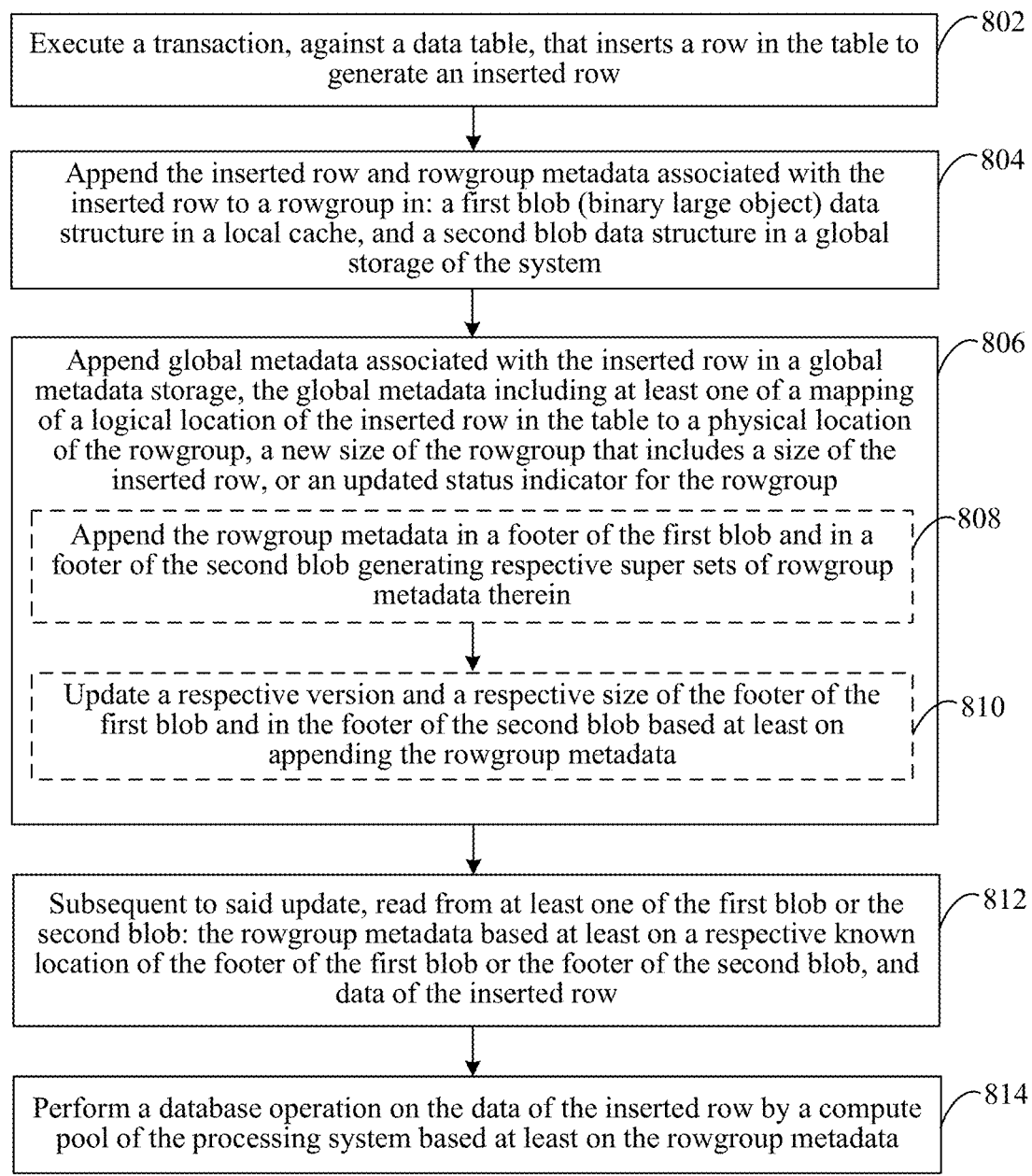
FIG. 8 shows a flowchart for rowgroup consolidation with delta accumulation and versioning in distributed systems, in accordance with an example embodiment.
Figure 9:
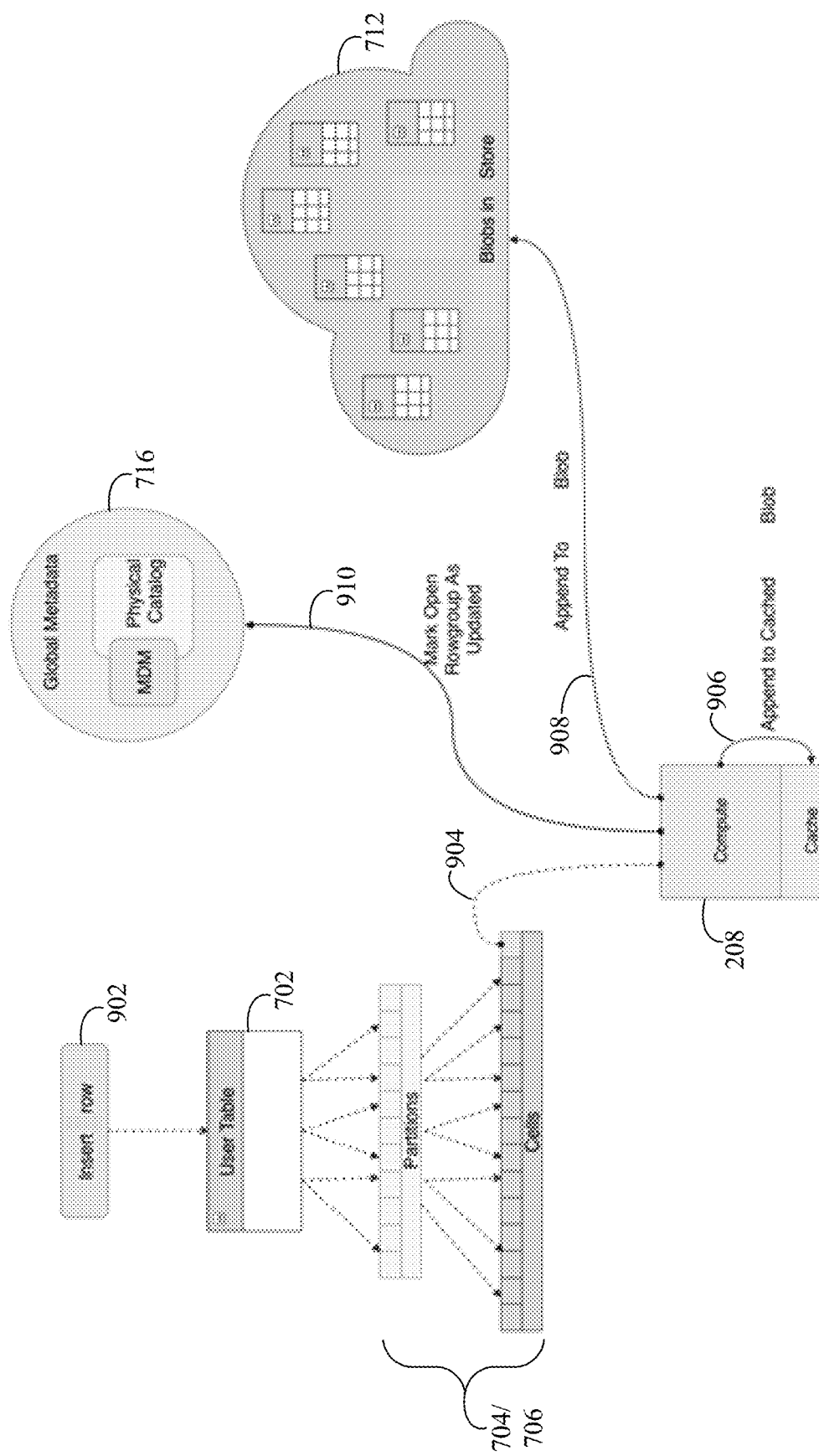
FIG. 9 shows a flow diagram for rowgroup consolidation with delta accumulation and versioning in distributed systems, in accordance with an example embodiment.

For example, FIGS. 8, 9, and 10, each of which are for rowgroup consolidation with delta accumulation and versioning, according to example embodiments, will now be described. FIG. 8 shows a flowchart 800 for row insertion operations, and FIG. 9 shows a flow diagram 900 of a distributed system associated with the performance of flowchart 800. FIG. 10 shows a flow diagram 1000 of a distributed system associated with the performance of flowchart 800. In embodiments, this distributed system in FIGS. 9 and 10 may be an embodiment of system 200 in FIG. 2, including compute pool(s) 208 as shown that perform insert operations. In FIG. 9, this is illustrated in the context of global metadata updates and appends to blobs, and in FIG. 10, this is illustrated over a timeline 1002 on a block blob 1004 that includes rows with row locator IDs 1-7, with rows having row locator IDs 1-5 being previously inserted by a transaction version T0, and with rows having row locator IDs 6-7 being previously inserted by a transaction version T1.

In FIG. 8, flowchart 800 begins at step 802. In step 802, a transaction is executed, against a data table, that inserts a row in the table to generate an inserted row. For example, as shown in FIG. 9 and flow diagram 900, an insert transaction 902 that will insert a row into CCI table 702 is performed by compute pool(s) 208 of system 200 in FIG. 2. That is, data will be inserted into columnstore rowset 704 and cells 706 as part of a rowgroup (such as rowgroups 708 in FIG. 7, not shown for brevity) that is initially read as operation 904 in order obtain a copy of the data to insert the new row(s) therein. As similarly illustrated in FIG. 10 and flow diagram 900, an insert transaction 1006 is performed by compute pool(s) 208 for block blob 1004, which may be an embodiment of one of rowgroups 708. Flow diagram 1000 shows two insert row operations of insert transaction 1006, an insert operation 1008 and an insert operation 1010. In embodiments, both of insert operation 1008 and insert operation 1010 may be perform prior to a flush operation 1012 being performed.

In step 804 of flowchart 800, the inserted row and rowgroup metadata associated with the inserted row to a rowgroup are appended in: a first blob (binary large object) data structure in a local cache, and a second blob data structure in a global storage of the system. For instance, in flow diagram 900, compute pool(s) 208 appends the inserted row and associated rowgroup metadata to a blob data structure in a local cache thereof as illustrated, such as in rowgroups 708 of FIG. 7, and to a global storage that includes open blob 712. Metadata such as the physical location of the row, the version, and/or the length of the data therein, may be provided for this updating, as described with respect to FIG. 5 (e.g., data in version field 502, length field 504, and/or row locator ID field 506). Likewise, with reference to FIG. 10 and flow diagram 1000, flush operation 1012 is performed by compute pool(s) 208 to append the two inserted rows from insert operation 1008 and insert operation 1010 to block blob 1004 as rows with row locator IDs 8 and 9, and as transaction version T2.

In embodiments, the appending in step 804 may be performed by global CCI delta manager 230 of FIG. 2.

In step 806, global metadata associated with the inserted row is appended in a global metadata storage, the global metadata including at least one of a mapping of a logical location of the inserted row in the table to a physical location of the rowgroup, a new size of the rowgroup that includes a size of the inserted row, or an updated status indicator for the rowgroup. Step 806 may include additional or alternate sub-steps, in embodiments. For instance, a step 808 may be performed in which the rowgroup metadata is appended in a footer of the first blob and in a footer of the second blob generating respective super sets of rowgroup metadata therein. Additionally, a step 810 may be performed in which Update a respective version and a respective size of the footer of the first blob and in the footer of the second blob based at least on appending the rowgroup metadata.

For example, in flow diagram 900, global metadata in global metadata store 716 is updated in an operation 910. In embodiments, the open rowgroup in which the row(s) are inserted may be marked as "updated," and the physical location of the row, the version, and/or the length of the data therein, may be provided for this updating, as described with respect to FIG. 5 (e.g., data in version field 502, length field 504, and/or row locator ID field 506). In flow diagram 1000 of FIG. 10, an update size operation 1014 is illustrated as being performed subsequent to flush operation 1012. Update size operation 1014 may update global metadata store 716 with an updated size of the data in block blob 1004. For instance, prior to flush operation 1012, block blob 1004 is illustrated as having N bytes of data, and flush operation 1012 adds M bytes of data to block blob 1004. Update size operation 1014 provides this updated size information for storing in global metadata store 716 for the open rowgroup comprising block blob 1004. Subsequently, a commit operation 1016 is performed to finalize insert operation 1006. The appending and updating of metadata described here may be performed in a footer to increase system performance in locating such metadata during subsequent operations on its associated data in the rowgroups, as noted herein.

In embodiments, the global metadata updating may be performed by global metadata manager 228 of FIG. 2.

Referring again to FIG. 8 and flowchart 800, in step 812, subsequent to said update, the rowgroup metadata is read from at least one of the first blob or the second blob based at least on a respective known location of the footer of the first blob or the footer of the second blob, and data of the inserted row. For instance, in a subsequent operation by any one of compute pool(s) 208 on the data in the rowgroup that is inserted according to flowchart 800, the rowgroup metadata is read from the locally cached blob by the associated node(s) or from open blob 712 if the rowgroup metadata is not locally cached. Because the metadata is stored in the footer of the file for the respective blobs, a scanner is enabled to more quickly locate the metadata, which in turn provides for more quickly locating the associated data inserted into the rowgroup.

In step 814, a database operation is performed on the data of the inserted row by a compute pool of the processing system based at least on the rowgroup metadata. For instance, compute pool(s) 208 are thus enabled to read the data, as well as further modify the data, based at least on locating it via the rowgroup metadata.

As illustrated for the FIGS. 7-10 and described above, a row is inserted by a compute node, e.g., by executing a transaction, into a user table in a specific cell of a partition therein. To reflect this insert operation, the compute node may append the new row into a rowgroup of a blob, as described above, in a delta store data structure maintained in a cache thereof and in a corresponding rowgroup of a blob in a global delta store data structure. Additionally, global metadata store is updated to include global metadata, as described herein.

In embodiments, writes to the blob files are made on a commit/flush basis, which batches our I/O operations, and saves multiple round trips. It is contemplated herein that memory pressure may lead to flushes before commits. Additionally, as noted above, writes may be performed to a locally cached open rowgroup in a blob file as well as to the remote open group in the global blob file of the delta store. The open rowgroup may be marked as updated in the global metadata, and other compute pool readers can use this metadata to determine whether their respective local cached blob is valid/invalid. Additionally, as noted herein, a size of the row is maintained in the global metadata that allows scans to differentiate between what is cached and what needs to be read, i.e., on the difference between the sizes needs to be read from the remote, global blob.

In scenarios for which multiple transactions/threads attempt to trickle-insert rows to the same cell of the user table, the embodiments herein contemplate that a single open rowgroup can handle multiple inserters, and/or that inserters exclusively own an open rowgroup and concurrent inserters create their own open rowgroup. In the latter case, each concurrent insert creates its own open rowgroup, and begins to insert rows there, thus obviating concurrency issues. Readers scan the file up to the size maintained in the metadata, and thus, in-flight writes do not need to be read in. Additionally, each thread/transaction inserts to the first available open rowgroup, and if one is not available, a new open rowgroup is created where a transaction exclusively owns this rowgroup, and concurrent inserters cannot insert to this rowgroup until the transaction commits/aborts. Further, each commit increases the size in the metadata to account for the size of the row it has written. If a transaction aborts before the size is accounted for, the blocks are deemed invalid and may be overwritten. In summary, concurrent insert issues may be removed entirely, leading to a far simpler approach, in embodiments, and aborted transactions are instantly rolled back based at least on versioning and the maintained metadata.

For example, the breaking apart of an open rowgroup into multiple files at the storage layer, and the lack of a requirement to keep the metadata for these files in physical metadata, embodiments provide a way to ensure that our file/blob properties are valid with respect to the data version by maintaining a one-version history of each property, along with the version stamp of the property. The rules to overwrite a property, include but are not limited to: invalid versions be overwritten first, and if no invalid versions are available, then the oldest version is overwritten. For example, assuming the maintenance of a row count for the file with a row count value and a version ID: e.g., (row count 10, version 1) and (row count 20, version 2). Here, a single version is valid to a scanner. If both versions are committed and visible versions, then the latest visible version is the version to be use, which would be version 2 in the above example. If one version is invalid, then the other version is valid. This is because the new writer will overwrite the invalid property first, meaning that at all times, one version is valid. This also means that only the latest version of the property can be invalid. Accordingly, the blob properties are not versioned with respect to temporal queries. This is because, temporal queries will always read the latest visible property, and let the rows within the file decide.

Figure 10:
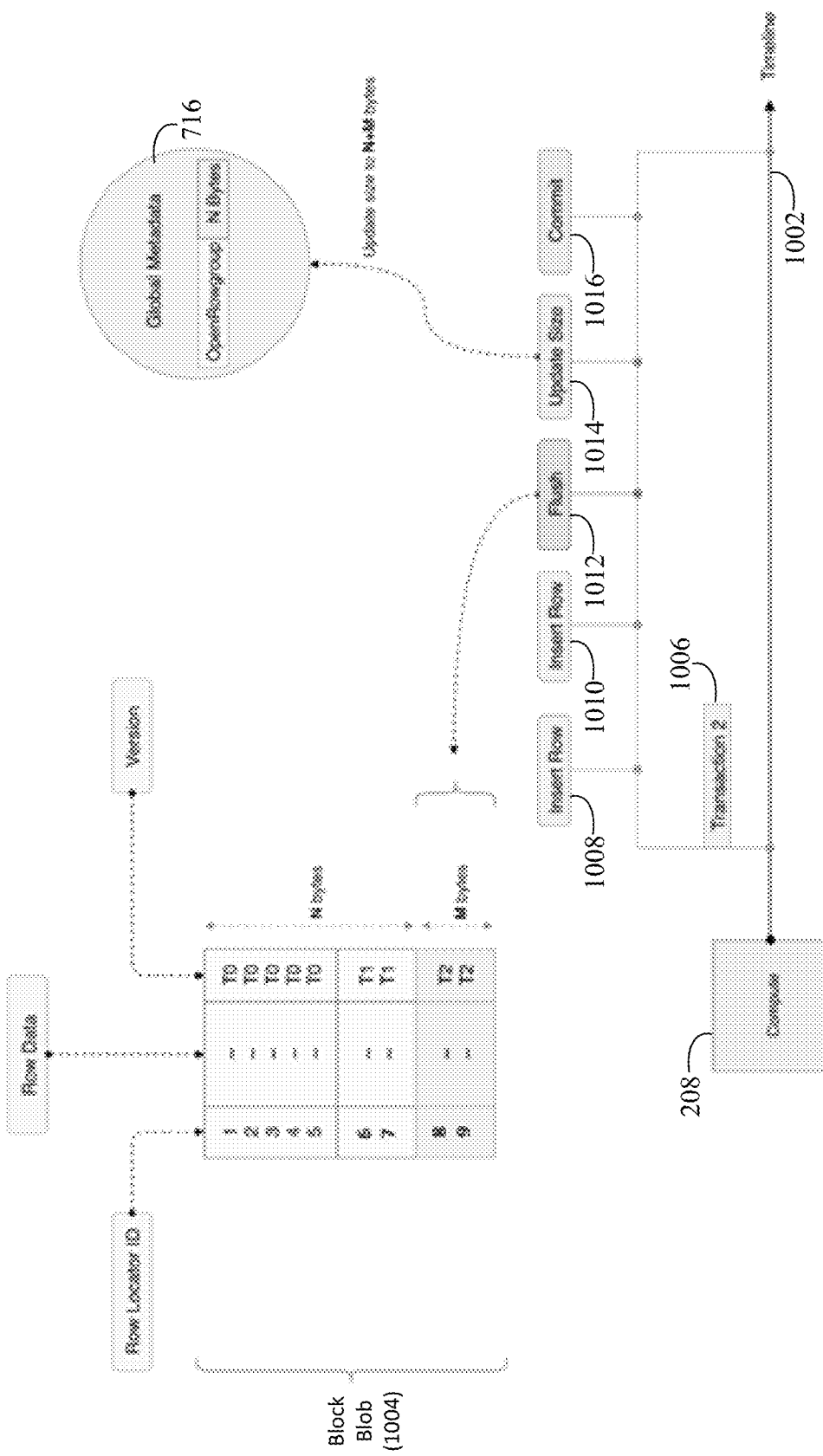
FIG. 10 shows a flow diagram for rowgroup consolidation with delta accumulation and versioning in distributed systems, in accordance with an example embodiment.

As noted for the illustrated example of FIG. 10, a compute node of a compute pool, e.g., one of compute node(s) 214 in compute pool(s) of FIG. 2, may execute insert transaction 1006, shown as "transaction 2" and version "T2." It is previously noted that this transaction inserts two rows (e.g., as a streaming row store), comprising M bytes of data, into an open rowgroup of a blob associated with a user table for which two prior transactions have already inserted rows, comprising N bytes of data. Each row is exemplarily shown as including a row locator ID (e.g., a logical table row locator ID), row data, and a version ID. When the insert transactions are complete, e.g., as described above for the insert operation flow, the resulting rows are flushed to the blob, and the global metadata is updated to reflect the addition of M bytes to the existing N bytes in the blob (i.e., resulting in N+M bytes). The open rowgroup may also be noted as "updated" in the global metadata. Subsequently, the inserted rows for insert transaction 1006 are committed.

Once insert transaction 1006 begins inserting, no other transaction may be allowed to insert to the same open rowgroup. As noted above, the metadata includes a record indicating the size of the rowgroup, and the size may not be updated based at least on the inserted rows until the very end of insert transaction 1006, lastly, before the commit. This allows for the smallest possible window where a fail can occur and leave aborted rows inside the open rowgroup. Similarly, failing any time before the update to the size in the open rowgroup allows for instant rollback semantics. That is, any new transaction that takes ownership of the open rowgroup will take over at the size indicated by the global metadata and may overwrite the aborted rows, while scanners will only scan until the size indicated by the global metadata. Failing after the update size step shown will leave aborted rows in the open rowgroup, and these rows may be completely flushed with each row being fully versioned. Thus, scanners may skip these rows as transaction being invalid is known via the transaction manager abort cache listing, and the aborted rows will be removed later, e.g., when a tuple mover compresses this rowgroup.

Figure 11:
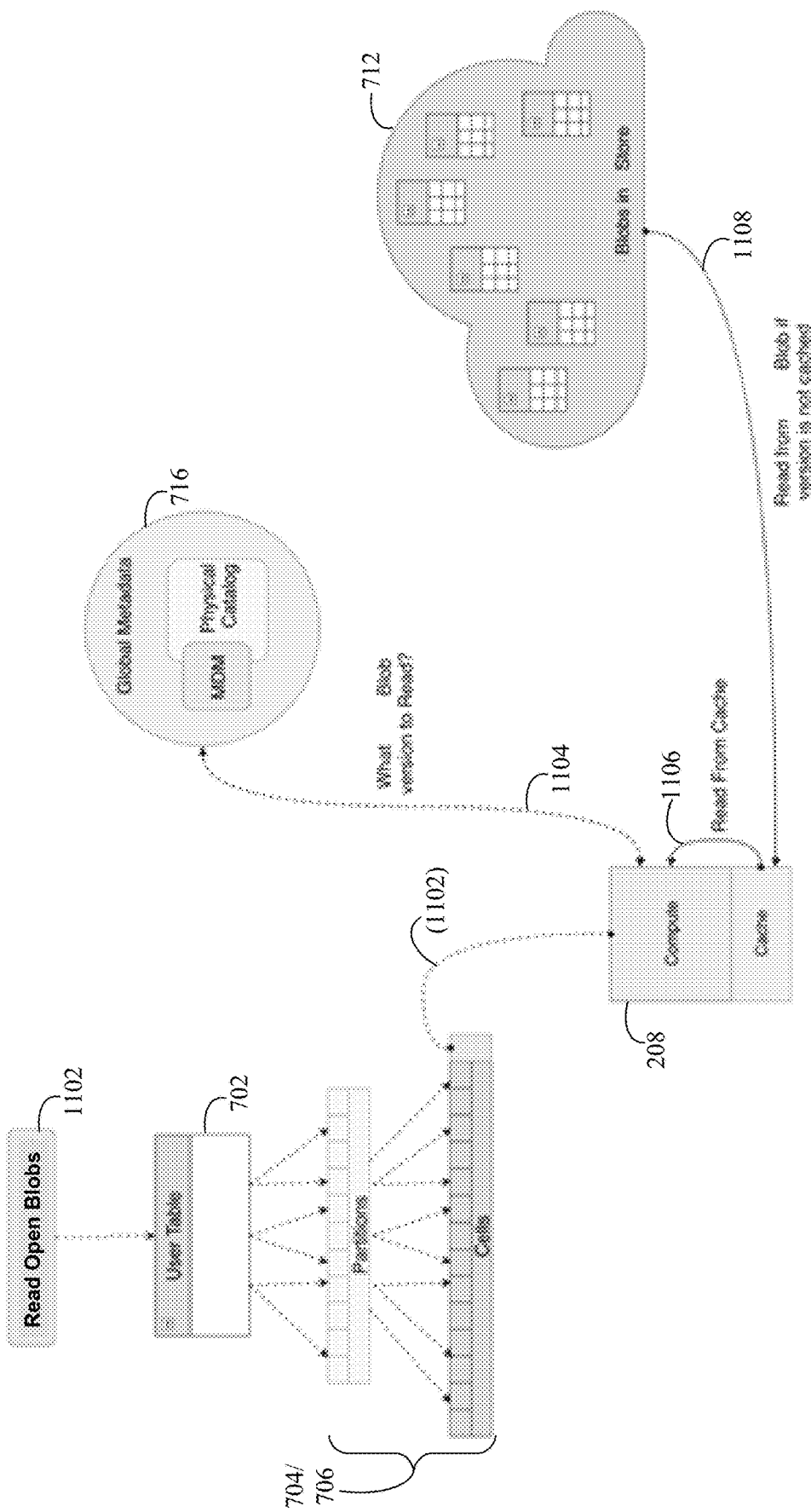
FIG. 11 shows a flow diagram for rowgroup consolidation with delta accumulation and versioning in distributed systems, in accordance with an example embodiment.

In furtherance of flowchart 800 in FIG. 8, and also now referring to FIG. 11, a flow diagram 1100 for rowgroup consolidation with delta accumulation and versioning is shown, according to an example embodiment. Flow diagram 1100 exemplarily illustrates a read row operation, as noted herein. Flow diagram 1100 is illustrated in the context of a distributed system, e.g., associated with the performance of an embodiment of flowchart 800. In embodiments, this distributed system in FIG. 11 may be an embodiment of system 200 in FIG. 2, including compute pool(s) 208 as shown that perform read operations. In FIG. 11, this is illustrated in the context of global metadata updates and appends to blobs For example, as shown in FIG. 11 and flow diagram 1100, a read transaction 1102 that will read open blobs, e.g., row of data therein, associated with CCI table 702 is performed by compute pool(s) 208 of system 200 in FIG. 2. That is, data will be read or scanned from columnstore rowset 704 and cells 706, as part of a rowgroup (such as rowgroups 708 in FIG. 7, not shown for brevity) that is read and operated as operation 904 to insert the new row(s).

As illustrated for flow diagram 1100, a row is read by a compute node of compute pool(s) 208, e.g., by executing a scan transaction, performing read transaction 1102 to a user table (e.g., CCI table 702) in a specific cell of a partition therein from columnstore rowset 704 and cells 706, as part of a rowgroup (such as rowgroups 708 in FIG. 7, not shown for brevity), which may be a block blob, as described above. In the context of the compute node point of view, read transaction 1102 may include utilizing global metadata store 716 in a read/retrieve operation 1104 to retrieve the global metadata for the row(s) to be read by the scanner, e.g., the blob version(s) to be read, its location, etc., as described herein. The compute node may then retrieve the data from a rowgroup of a blob, as described above, in a delta store data structure maintained in a cache thereof, in a read/retrieve operation 1106, and/or from a corresponding rowgroup of a blob in a global delta store data structure (e.g., if not cached), in a read/retrieve operation 1108.

In embodiments, each virtual data warehouse instance or compute pool attempts to cache the open rowgroup on its first read, when acting as the scanner. Reads by the scanner(s) are able to determine when an open rowgroup has been updated based at least on the global metadata, and if updated, the new versions are brought into the cache of the scanner(s). Because embodiments provide for append-only updating, only the difference between the cached version and the remote version needs to be read in. As multiple versions can be read in, the scanner may be configured to filter out rows that are visible based at least on each row being versioned, where scanner(s) will determine which versions are valid to them, and based at least on the rows that are visible for the scan version being filtered further based at least on the delete file associated with the rowgroup in which the row(s) resides. Thus, per embodiments, each delete file entry record is also versioned.

In the context of the description above, including FIGS. 4-11, additional specific operations that alter data will now be described.

Figure 12:
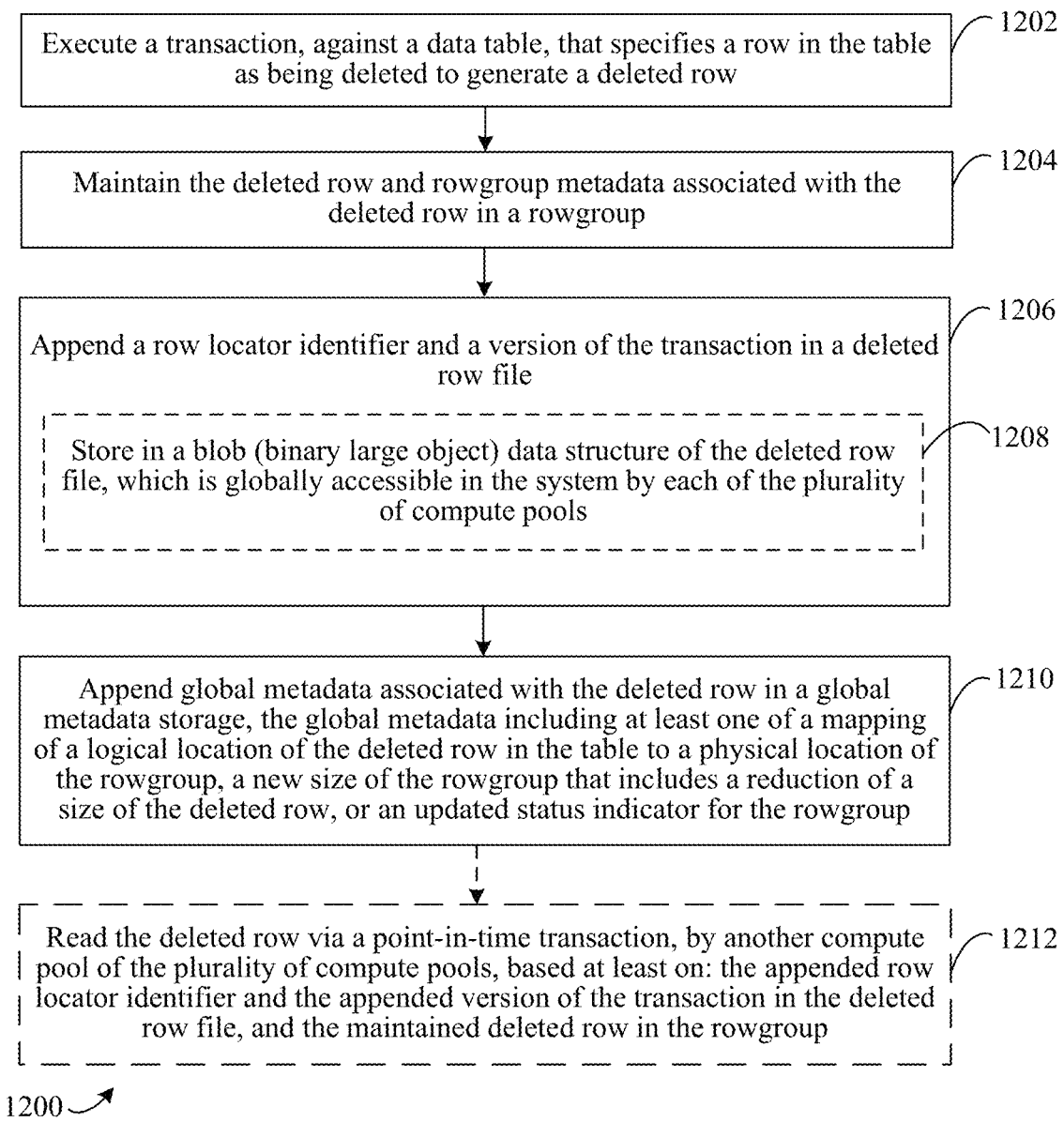
FIG. 12 shows a flowchart for rowgroup consolidation with delta accumulation and versioning in distributed systems, in accordance with an example embodiment.

For example, FIG. 12, which is for rowgroup consolidation with delta accumulation and versioning, according to example embodiments, will now be described. FIG. 12 shows a flowchart 1200 for row deletion operations. In embodiments, a distributed system performs flowchart 1200 and may be an embodiment of system 200 in FIG. 2, including compute pool(s) 208. Flowchart 1200 may be an embodiment of flowchart 800, and may, as described here, or optionally by incorporation, include steps of flowchart 800 either expressly or generally with respect to appending. Flowchart 1200 is described as follows.

Flowchart 1200 begins at step 1202. In step 1202, a transaction is executed against a data table that specifies a row in the table as being deleted to generate a deleted row. For example, a delete row transaction that will delete a row from a user table such as CCI table 702 in FIG. 7 is performed by compute pool(s) 208 of system 200 in FIG. 2. That is, a data row of a blob may be deleted from a columnstore rowset/cell, e.g., columnstore rowset 704 and cells 706 of FIG. 7 from a rowgroup such as rowgroups 708 in FIG. 7 that is initially read in order obtain a copy of the data to delete the row(s) therein.

In step 1204 of flowchart 1200, the deleted row and rowgroup metadata associated with the deleted row are maintained in a rowgroup. For instance, while a row(s) are being deleted, the data for the deleted row(s) is still maintained in the rowgroup, along with associated rowgroup metadata. Simply put, the compute pool performing the delete operation does not erase or write-over the row to be deleted, but rather performs other operations that inform the system of the deletion, as described below, which enables efficient point-in-time transactions.

In step 1206, a row locator identifier and a version of the transaction are appended in a deleted row file. For example, with reference to FIG. 7, rowgroups 708 includes a delete file portion, which may be locally cached, in which a row locator identifier and a version of the transaction are appended, and delete blob 714 also stores deleted row information. Referring also to FIG. 6, a row locator identifier 602 and a version 604 of the transaction are shown in delete file 600. Information for newly-deleted rows is appended to delete files herein, and thus, each deleted row is identified in a delete file while its data is maintained in its rowgroup. That is, a delete operation, according to embodiments, is essentially an insert operation, as similarly described for flowchart 800 of FIG. 8, but where the row locator identifier and version of the transaction are appended to a delete file rather than appending new rows to a rowgroup. In embodiments, the appending in step 1206 may be performed by compute pool(s) 208 global CCI delta manager 230 of FIG. 2.

Step 1206 may additionally include a step 1208. In step 1208, the row locator identifier and the version of the transaction are stored in a blob (binary large object) data structure of the deleted row file, which is globally accessible in the system, which may be a data warehouse system, by each of the plurality of compute pools. For instance, as described herein, embodiments provide for blobs, such as block blobs described for FIG. 4, to be utilized in delete files for storage of deleted row information, and these blobs are accessible by other compute nodes and components of distributed systems whereby these other nodes/components are enabled to determine if data is valid and/or up-to-date when performing operations thereby.

In step 1210, global metadata associated with the deleted row in a global metadata storage, the global metadata including at least one of a mapping of a logical location of the deleted row in the table to a physical location of the rowgroup, a new size of the rowgroup that includes a reduction of a size of the deleted row, or an updated status indicator for the rowgroup. For example, the update of global metadata associated with the deleted row may be included in global metadata store 716, described with respect to FIG. 7, which is globally accessible to other nodes and components in the distributed system, e.g., by global metadata manager 228 of FIG. 2.

In step 1212, which may be optional, or subsequently performed at a later time after step 1210, the deleted row is read via a point-in-time transaction, by another compute pool of the plurality of compute pools, based at least on: the appended row locator identifier and the appended version of the transaction in the deleted row file, and the maintained deleted row in the rowgroup. For instance, after step 1210, a point-in-time read transaction may be performed by any compute pool in the distributed system. The point-in-time read transaction may specify a point in time during which the deleted row was not yet deleted and was still valid data. Because deleted rows are maintained in their rowgroups, as described above, point-in-time reads are enabled for embodiments herein. The appended row locator identifier and the appended version of the transaction in the deleted row file, either locally in a cache storing rowgroups 708, or globally in delete blob 714, are utilized to perform the point-in-time read transaction on the maintained deleted row in the rowgroup.

Figure 13:
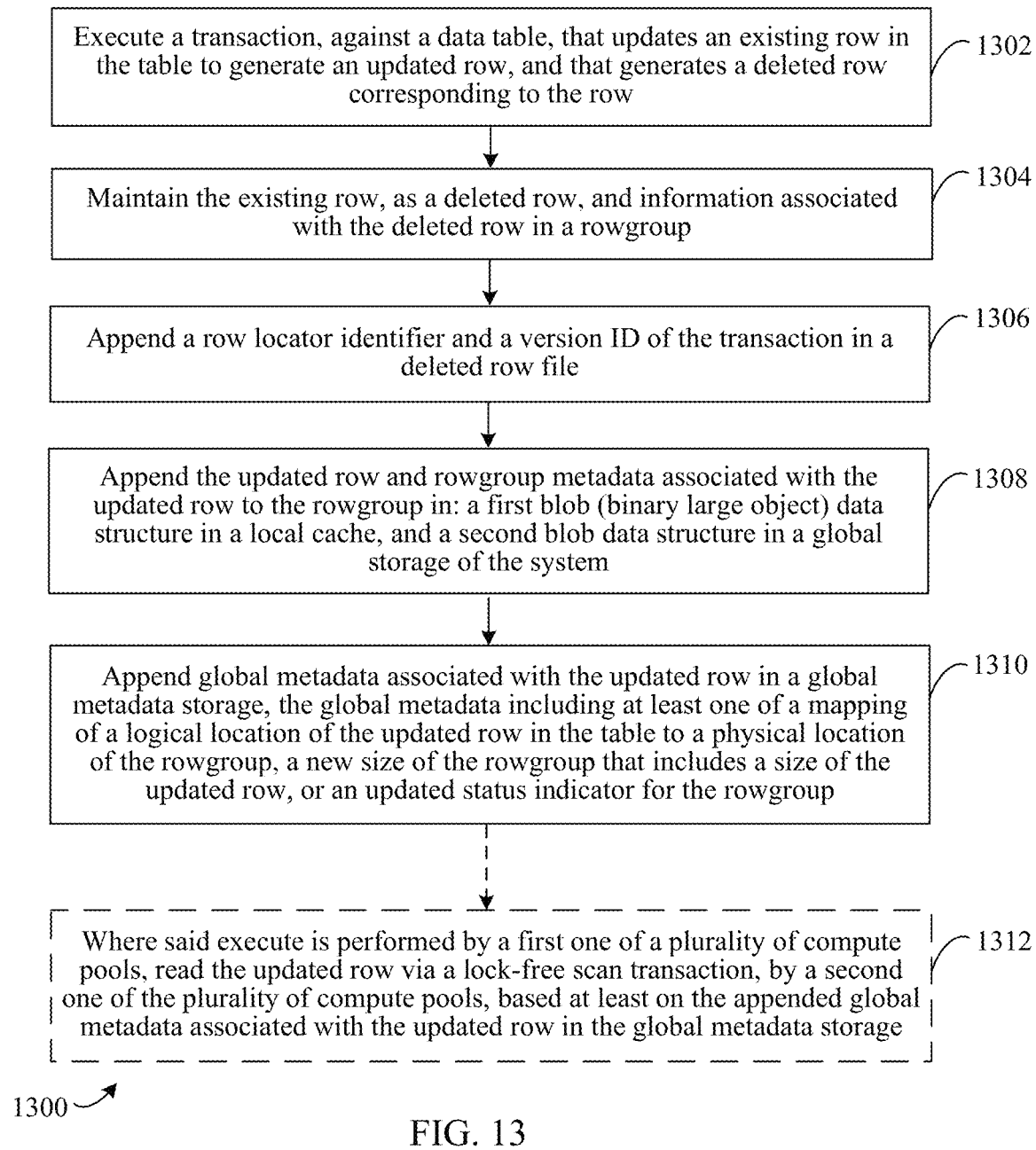
FIG. 13 shows a flowchart for rowgroup consolidation with delta accumulation and versioning in distributed systems, in accordance with an example embodiment.

Turning now to FIG. 13, and regarding row updates, a row update that is performed may comprise a delete row operation and an insert row operation, both of which are described above. As each of these two operations above are versioned, the previous versions will see the original row, whereas newer versions will only see the newly inserted row.

For example, FIG. 13, which is for rowgroup consolidation with delta accumulation and versioning, according to example embodiments, will now be described. FIG. 13 shows a flowchart 1300 for row update operations. In embodiments, a distributed system performs flowchart 1300 and may be an embodiment of system 200 in FIG. 2, including compute pool(s) 208. Flowchart 1300 may be an embodiment of flowchart 800 of FIG. 8 and/or flowchart 1200 of FIG. 12, and may, as described here, or optionally by incorporation, include steps of flowchart 800 and/or flowchart 1300 either expressly or generally with respect to appending. Flowchart 1300 is described as follows.

Flowchart 1300 begins at step 1302. In step 1302, a transaction is executed against a data table that updates an existing row in the table to generate an updated row, and that generates a deleted row corresponding to the row. For example, an update row transaction will insert the "updated row" in a rowgroup and "delete" the prior row from a user table such as CCI table 702 in FIG. 7. The update row transaction is performed by compute pool(s) 208 of system 200 in FIG. 2, in embodiments. That is, a new data row of a blob may be inserted as the updated row in, and the prior version of that row is deleted from, a columnstore rowset/cell, e.g., columnstore rowset 704 and cells 706 of FIG. 7 from a rowgroup such as rowgroups 708 in FIG. 7 that is initially read in order obtain a copy of the data to delete the row(s) therein.

In step 1304 of flowchart 1300, as noted, the existing row is maintained as a deleted row, and information associated with the deleted row is also maintained in a rowgroup. For instance, the while a row(s) is updated and is being marked as deleted, i.e., the prior version of the row is no longer current, the data for the now-deleted row(s) is still maintained in the rowgroup, along with associated rowgroup metadata. Simply put, the compute pool performing the updated transaction/operation does not erase or write-over the version row to be deleted, as it is no longer current, but rather performs other operations that inform the system of the update and the deletion of the prior version of the row, as described below, which enables efficient point-in-time transactions.

In step 1306, a row locator identifier and a version identifier of the transaction are appended in a deleted row file. For example, as described above, and with reference to FIG. 7, rowgroups 708 includes a delete file portion, which may be locally cached, in which a row locator identifier and a version of the transaction are appended for the prior version of the row that is now effectively deleted. Referring also to FIG. 6, a row locator identifier 602 and a version 604 of the transaction are shown in delete file 600. Information for effectively-deleted rows is appended to delete files as described herein, and thus, each row that is updated, and treated as a deleted row, is identified in a delete file while its data is maintained in its rowgroup. That is, this effective, delete operation, according to embodiments, is coupled with an insert operation, as similarly described for flowchart 800 of FIG. 8, but where the row locator identifier and version of the transaction are appended to a delete file rather than appending new rows to a rowgroup, in addition to the insertion of the new, updated row version. In embodiments, the appending in step 1306 may be performed by compute pool(s) 208 global CCI delta manager 230 of FIG. 2.

In step 1308, the updated row and rowgroup metadata associated with the updated row are appended to the rowgroup in: a first blob (binary large object) data structure in a local cache, and a second blob data structure in a global storage of the system. For instance, as described herein, embodiments provide for blobs, such as block blobs described for FIG. 4, to be utilized in delete files for storage of deleted row information, and these blobs are accessible by other compute nodes and components of distributed systems whereby these other nodes/components are enabled to determine if data is valid and/or up-to-date when performing operations thereby.

In step 1310, global metadata associated with the updated row is appended in a global metadata storage, the global metadata including at least one of a mapping of a logical location of the updated row in the table to a physical location of the rowgroup, a new size of the rowgroup that includes a size of the updated row, or an updated status indicator for the rowgroup. For example, the update of global metadata associated with the new, updated row may be included in global metadata store 716, described with respect to FIG. 7, which is globally accessible to other nodes and components in the distributed system, e.g., by global metadata manager 228 of FIG. 2. In embodiments, the prior row, now deleted, may also have its global metadata stored in global metadata store 716.

In step 1312, which may be optional, or subsequently performed at a later time after step 1310, the execution in step 1312 is performed by a first one of a plurality of compute pools, and the updated row is read via a lock-free scan transaction, by a second one of the plurality of compute pools, based at least on the appended global metadata associated with the updated row in the global metadata storage. For instance, after step 1310, a lock-free read or scan transaction may be performed by any compute pool in the distributed system to read/scan the updated row. This lock-free transaction is performed using the appended global metadata associated with the updated row in the global metadata storage, as noted above, which is enabled by the versioning and delete-insert semantics, as well as append-only storage of both rows in rowgroups and metadata, for read-only queries. Readers of newly inserted, or updated, data are enabled to read/scan without locks as soon as the new data is picked up, i.e., when the new versions of data become visible after a commit by the writer.

Figure 14:
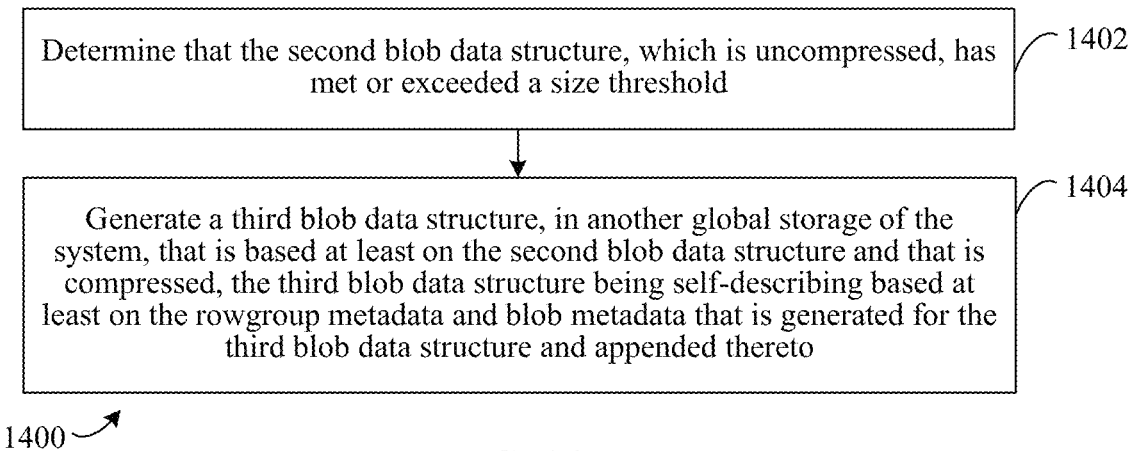
FIG. 14 shows a flowchart for rowgroup consolidation with delta accumulation and versioning in distributed systems, in accordance with an example embodiment.

FIG. 14, which is for rowgroup consolidation with delta accumulation and versioning, according to example embodiments, will now be described. FIG. 14 shows a flowchart 1400 for compressing blobs. In embodiments, a distributed system performs flowchart 1400 and may be an embodiment of system 200 in FIG. 2, including compute pool(s) 208. Flowchart 1400 may be an embodiment of any flowchart described herein. Flowchart 1400 is described as follows.

Flowchart 1400 begins at step 1402. In step 1402, it is determined that the second blob data structure, which is compressed, has met or exceeded a size threshold. For example, rowgroups may be stored in blobs, as described herein, which increase in size during operations on data included therein, e.g., via appending. In embodiments, rowgroup consolidation manager 226 is configured to determine when a blob reaches or exceeds a pre-determined size threshold. In embodiments, blobs in local caches and or in globally stored blobs may be so monitored.

In step 1404, a third blob data structure is generated, in another global storage of the system, that is based at least on the second blob data structure and that is compressed, where the third blob data structure is self-describing based at least on the rowgroup metadata and blob metadata that is generated for the third blob data structure and appended thereto. For instance, a blob may be created by rowgroup consolidation manager 226 as the third blob in compressed blob 710, described with respect to FIG. 7. In embodiments, rowgroup consolidation manager 226 moves blobs that meet/exceed size thresholds into a columnar compressed form for storage in compressed blob 710. Additionally, these compressed blobs are self-describing via their unique and extendable file format makes blobs self-describing as well as supports efficient columnar data access. These self-describing blobs/files allow access thereto for other related, and unrelated, systems. As noted herein, blob files may include partial columnstore metadata with a binary type that is inserted into the blob files. For compressed blobs, e.g., rowgroup consolidated blobs, these files may be stored in user storage of the users that owns the data set associated with the compressed blobs, and the blob may be divided into three parts, in embodiments: a column store data section, a metadata section, and a blob footer, which makes the blob self-contained and self-describing. In embodiments, non-blob files are also contemplated, e.g., text documents, etc.

Figure 15:
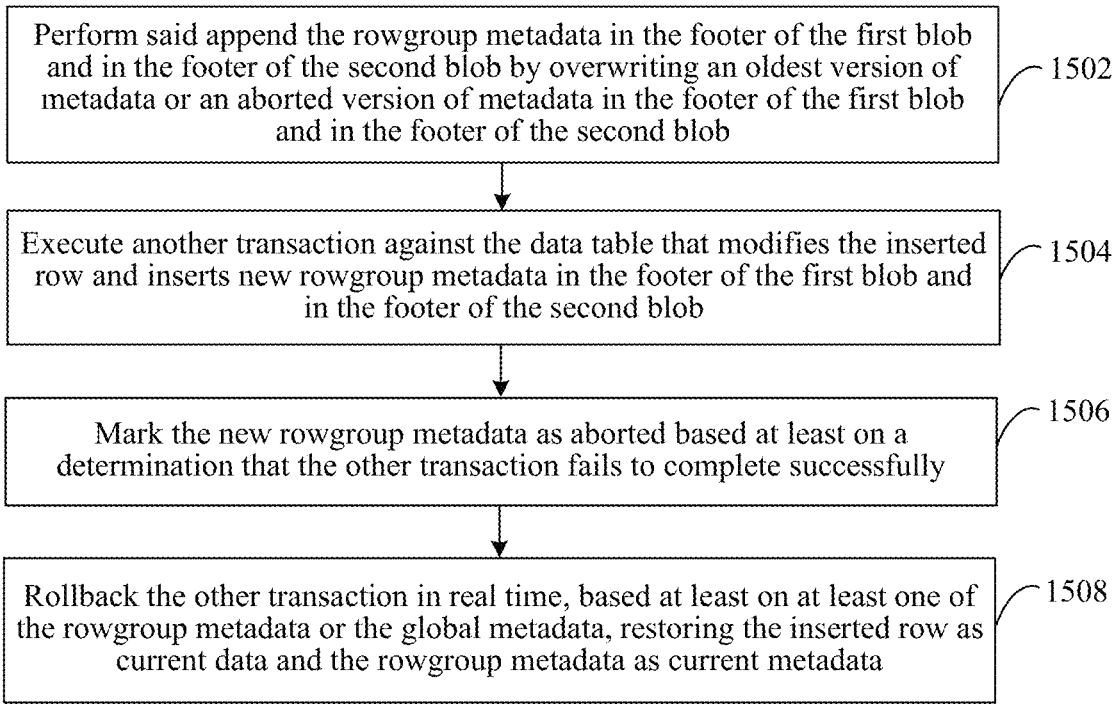
FIG. 15 shows a flowchart for rowgroup consolidation with delta accumulation and versioning in distributed systems, in accordance with an example embodiment.

FIG. 15 will now be described. As noted above, two versions of metadata are maintained in the updatable metadata section of each file. When a node takes exclusive access to a file such as a blob to modify data therein, the node overwrites the aborted or oldest version of the metadata, while leaving the un-aborted or most current version in the metadata section of the footer. That is, the prior current/un-aborted version becomes the oldest version of the metadata, and the newest metadata becomes the most current version. Accordingly, if the node performing the modifying of the data aborts, the previous version of the metadata is valid and available, and additionally, readers or scanners of data will use the latest committed version of the metadata, and do not see any in-progress metadata until the node commits. As described above, aborted rows are overwritten by the next node modifying the metadata. This enables instant rollback of modifying transactions that are aborted. Instant rollback is achieved, e.g., through metadata version flips and transaction-level file locking.

FIG. 15, which is for rowgroup consolidation with delta accumulation and versioning, according to example embodiments, shows a flowchart 1500 for instant rollback. In embodiments, a distributed system performs flowchart 1500 and may be an embodiment of system 200 in FIG. 2, including compute pool(s) 208. Flowchart 1500 may be an embodiment of any flowchart described herein, e.g., in the context of appending metadata in footers of blob data structures, and while not so limited, is exemplarily described as an embodiment of flowchart 800 of FIG. 8. Flowchart 1500 is described as follows.

Flowchart 1500 begins at step 1502. In step 1502, said append the rowgroup metadata in the footer of the first blob and in the footer of the second blob is performed by overwriting an oldest version of metadata or an aborted version of metadata in the footer of the first blob and in the footer of the second blob. As noted above, such footers may include two versions of metadata, such as a most current version, an older version, an aborted version, etc. When a transaction causes new metadata to be appended to a footer, according to embodiments, the older or aborted versions are overwritten via the append, leaving the prior, current version as an older version of metadata in the footer, and the new metadata as the most current version.

In step 1504, another transaction is executed against the data table that modifies the inserted row and inserts new rowgroup metadata in the footer of the first blob and in the footer of the second blob. For example, subsequent to step 1502, a node may perform other transactions that modify the inserted row associated with the now-current metadata. In the course of such a transaction, as noted herein, metadata with this other, subsequent transaction is written to the footer of first blobs in a local cache and second blobs in a global storage of the system.

In step 1506, the new rowgroup metadata is marked as aborted based at least on a determination that the other transaction fails to complete successfully. For instance, if a transaction modifies or attempts to modify data in a blob, and terminates prior to committing, that transaction has aborted, and any appended metadata is correspondingly marked as aborted in the footer(s) in which it was appended.

In step 1508, the other transaction is rolled-back in real time, based at least on at least one of the rowgroup metadata or the global metadata, restoring the inserted row as current data and the rowgroup metadata as current metadata. For example, as two versions of metadata are maintained in the footers of the local cache blobs (e.g., first blobs) and the globally-stored blobs (e.g., second blobs), even when an aborted version of metadata is written, the prior and previously-valid version of the metadata remains in the footers for instant rollback to the prior version of data and metadata. In essence, the metadata version is flipped back to the prior version, and with transaction-level file locking implemented according to embodiments, the aborted data is not visible for access to other transactions. Likewise, scanners/readers are protected as in-progress data is not visible.

Regarding row schema, the scanning of blobs requires that each value in a row is understood by the scanner. Embodiments herein provide such enablement, and also provide for the handling of varying length columns, where [column ID, length] properties for each column, which may be sorted, are provided in the front of the record. The non-existence of the column values may result in default values attributed to a column (e.g., NULL or any default value), and a '0' length may be indicated by '0' length for the column.

Regarding delta store file generation and selection, physical metadata links an open rowgroup to a container. However, within this container, there may be a list of files, each of which contain some rows and can only be appended to by a single inserter. For an inserter, embodiments provide the ability to distinguish between a locked file and an unlocked file, and if there are no unlocked files, the ability to construct a new file. For selection, the list of files is iterated through, and an attempt is made to take a lock on the file. Failing to get the lock means that another selector holds the file locked, and another file should be tried. For generation, the last file ID may be incremented, and an attempt made to take a lock on this new file ID. Failing this lock, the file ID is incremented again, and the lock attempt is retried. When successful, a new file is created with this file ID.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any data structures, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 16:
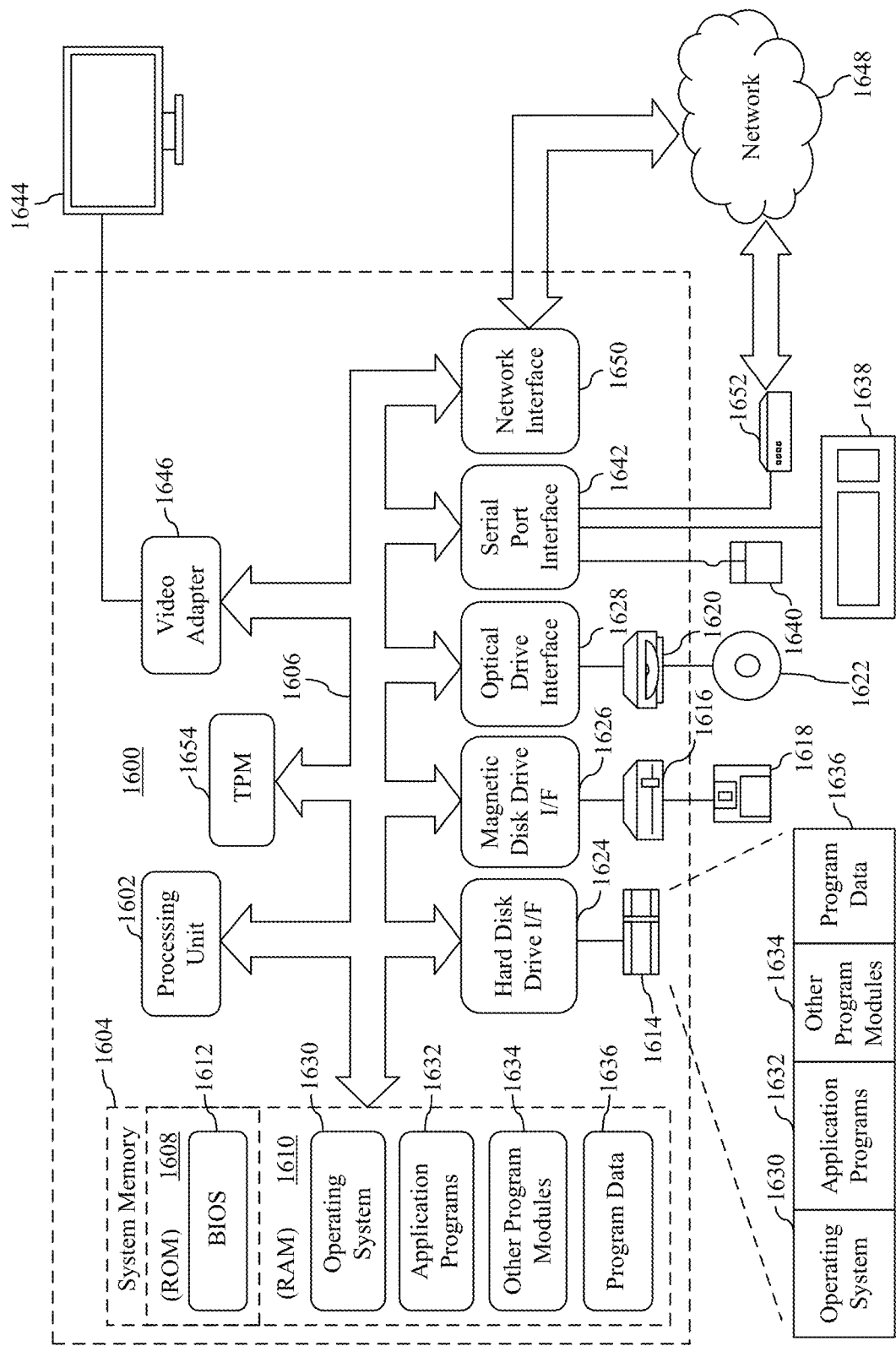
FIG. 16 shows a block diagram of an example computing device that may be used to implement embodiments.

FIG. 16 depicts an exemplary implementation of a computing device 1600 in which embodiments may be implemented. For example, embodiments described herein may be implemented in one or more computing devices or systems similar to computing device 1600, or multiple instances of computing device 1600, in stationary or mobile computer embodiments, including one or more features of computing device 1600 and/or alternative features. The description of computing device 1600 provided herein is provided for purposes of illustration, and is not intended to be limiting. Embodiments may be implemented in further types of computer systems, servers, and/or clusters, etc., as would be known to persons skilled in the relevant art(s).

As shown in FIG. 16, computing device 1600 includes one or more processors, referred to as processor circuit 1602, a system memory 1604, and a bus 1606 that couples various system components including system memory 1604 to processor circuit 1602. Processor circuit 1602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1602 may execute program code stored in a computer readable medium, such as program code of operating system 1630, application programs 1632, other programs 1634, etc. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computing device 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1630, one or more application programs 1632, other programs 1634, and program data 1636. Application programs 1632 or other programs 1634 may include, for example, computer program logic (e.g., computer program code or instructions) for implementing embodiments described herein, such as but not limited to, system 100 in FIG. 1 and system 200 in FIG. 2, along with any components and/or subcomponents thereof, as well any data structures, and operations of the flowcharts/flow diagrams described herein, including portions thereof, and/or further examples described herein.

A user may enter commands and information into the computing device 1600 through input devices such as keyboard 1638 and pointing device 1640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1602 through a serial port interface 1642 that is coupled to bus 1606, but may be connected by other interfaces, such as a parallel port, game port, or a universal serial bus (USB).

A display screen 1644 is also connected to bus 1606 via an interface, such as a video adapter 1646. Display screen 1644 may be external to, or incorporated in computing device 1600. Display screen 1644 may display information, as well as being a user interface for receiving user commands and/or other information (e.g., by touch, finger gestures, virtual keyboard, etc.). In addition to display screen 1644, computing device 1600 may include other peripheral output devices (not shown) such as speakers and printers.

Computing device 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

TPM 1654 may be connected to bus 1606, and may be an embodiment of any TPM, as would be understood by one of skill in the relevant art(s) having the benefit of this disclosure. For example, TPM 1654 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1614, removable magnetic disk 1618, removable optical disk 1622, other physical hardware media such as RAMs, ROMs, flash memory cards, digital video disks, zip disks, MEMs, nanotechnology-based storage devices, and further types of physical/tangible hardware storage media (including memory 1620 of FIG. 16). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1632 and other programs 1634) may be stored on the hard disk, magnetic disk, optical disk, ROM, RAM, or other hardware storage medium. Such computer programs may also be received via network interface 1650, serial port interface 1642, or any other interface type. Such computer programs, when executed or loaded by an application, enable computing device 1600 to implement features of embodiments discussed herein. Accordingly, such computer programs represent controllers of the computing device 1600.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for rowgroup consolidation with delta accumulation and versioning in distributed systems. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein enable reduced I/O and disk transaction costs, enable scalability for distributed processing systems and high data load performance, provide unique and extendable file formats making blobs self-describing and efficient columnar data access, provide an append-only storage mechanism that supports table schema alteration and maintains changed/deleted columnar data in files that allow accessing historical data at any point in time, provide instant rollback for data versions, enable no-lock reads/scans of data, and provide a flat data structure for data versioning in data warehouses and the like, while maintaining robust versioning of data through unique semantics. That is, the embodiments herein utilize a unique combination of row storage by appends to rowgroups, maintaining open rowgroups as uncompressed in global storage, and maintaining global metadata for the rows and rowgroups that were previously not available for software-based services, query hosts, or data warehouses, much less for the specific embodiments described herein.

The additional examples and embodiments described in this Section may be applicable to examples disclosed in any other Section or subsection of this disclosure.

A system is described herein. The system may be for rowgroup consolidation with global delta accumulation and versioning in distributed systems. The system includes a processing system that includes at least one processor, and a memory that stores computer-readable instructions that are executable by the processing system to execute a transaction, against a data table, that inserts a row in the table to generate an inserted row; append the inserted row and rowgroup metadata associated with the inserted row to a rowgroup in a first blob (binary large object) data structure in a local cache, and a second blob data structure in a global storage of the system; and append global metadata associated with the inserted row in a global metadata storage, the global metadata including at least one of a mapping of a logical location of the inserted row in the table to a physical location of the rowgroup, a new size of the rowgroup that includes a size of the inserted row, or an updated status indicator for the rowgroup.

In an embodiment, the system is a data warehouse system and the transaction is performed by a first compute pool of the data warehouse system, and a second compute pool of the data warehouse system is enabled to determine if data in the inserted row is at least one of valid or visible based at least on having access to the global metadata.

In an embodiment of the system, the computer-readable instructions are executable by the processing system to: access, by the second compute pool, the data in the inserted row from the second blob based at least on a determination that the data is valid or visible.

In an embodiment of the system, the computer-readable instructions are executable by the processing system to: append the rowgroup metadata in a footer of the first blob and in a footer of the second blob generating respective super sets of rowgroup metadata therein; and update a respective version and a respective size of the footer of the first blob and in the footer of the second blob based at least on appending the rowgroup metadata.

In an embodiment of the system, the computer-readable instructions are executable by the processing system to: subsequent to said update, read from at least one of the first blob or the second blob: the rowgroup metadata based at least on a respective known location of the footer of the first blob or the footer of the second blob, and data of the inserted row; and perform a database operation on the data of the inserted row by a compute pool of the processing system based at least on the rowgroup metadata.

In an embodiment of the system, the global metadata includes the mapping of the logical location of the inserted row in the table to the physical location of the rowgroup; and the computer-readable instructions are executable by the processing system to: determine the physical location of the rowgroup based at least on the global metadata prior to said read, and perform said read based at least on the physical location being determined.

In an embodiment of the system, the computer-readable instructions are executable by the processing system to: perform said append the rowgroup metadata in the footer of the first blob and in the footer of the second blob by overwriting an oldest version of metadata or an aborted version of metadata in the footer of the first blob and in the footer of the second blob; execute another transaction against the data table that modifies the inserted row and inserts new rowgroup metadata in the footer of the first blob and in the footer of the second blob; mark the new rowgroup metadata as aborted based at least on a determination that the other transaction fails to complete successfully; and rollback the other transaction in real time, based at least on at least one of the rowgroup metadata or the global metadata, restoring the inserted row as current data and the rowgroup metadata as current metadata.

In an embodiment of the system, the second blob data structure in the global storage of the system is uncompressed, and the computer-readable instructions, when executed by the processing system, cause the processing system to: determine that the second blob data structure has met or exceeded a size threshold; and generate a third blob data structure, in another global storage of the system, that is based at least on the second blob data structure and that is compressed, the third blob data structure being self-describing based at least on the rowgroup metadata and blob metadata that is generated for the third blob data structure and appended thereto.

A method implemented by a computing system is also described. The method may be for rowgroup consolidation with global delta accumulation and versioning in distributed systems. The method includes: executing a transaction, against a data table, that specifies a row in the table as being deleted to generate a deleted row; maintaining the deleted row and rowgroup metadata associated with the deleted row in a rowgroup; appending a row locator identifier and a version of the transaction in a deleted row file; and appending global metadata associated with the deleted row in a global metadata storage, the global metadata including at least one of a mapping of a logical location of the deleted row in the table to a physical location of the rowgroup, a new size of the rowgroup that includes a reduction of a size of the deleted row, or an updated status indicator for the rowgroup.

In an embodiment of the method, the computing system comprises a data warehouse system that includes a plurality of compute pools, and the appending the row locator identifier and the version of the transaction includes storing in a first blob (binary large object) data structure of the deleted row file, which is globally accessible in the data warehouse system by each of the plurality of compute pools.

In an embodiment, the method further includes: reading the deleted row via a point-in-time transaction based at least on: the appended row locator identifier and the appended version of the transaction in the deleted row file, and the maintained deleted row in the rowgroup.

In an embodiment of the method, a first compute pool of the plurality of compute pools performs said executing; and the reading the deleted row via the point-in-time transaction is performed by another compute pool of the plurality of compute pools.

In an embodiment of the method, the rowgroup is stored in a second blob data structure of a global storage and is uncompressed; and the method further includes: determining that the second blob data structure has met or exceeded a size threshold; and generating a third blob data structure, in another global storage of the system, that is based at least on the second blob data structure, that includes deleted row information, and that is compressed, the third blob data structure being self-describing based at least on the rowgroup metadata and blob metadata that is generated for the third blob data structure and appended thereto.

In an embodiment, the method further includes: deleting or compressing the deleted row file based at least on said generating the third blob data structure.

A computer-readable storage medium having program instructions recorded thereon that are executable by a computing system to perform a method is also described. The method may be for rowgroup consolidation with global delta accumulation and versioning in distributed systems. The method includes: executing a transaction, against a data table, that updates an existing row in the table to generate an updated row, and that generates a deleted row corresponding to the row; maintaining the existing row, as a deleted row, and information associated with the deleted row in a rowgroup; appending a row locator identifier and a version identifier of the transaction in a deleted row file; appending the updated row and rowgroup metadata associated with the updated row to the rowgroup in: a first blob (binary large object) data structure in a local cache, and a second blob data structure in a global storage of the system; and appending global metadata associated with the updated row in a global metadata storage, the global metadata including at least one of a mapping of a logical location of the updated row in the table to a physical location of the rowgroup, a new size of the rowgroup that includes a size of the updated row, or an updated status indicator for the rowgroup.

In an embodiment of the computer-readable storage medium, the computing system is a data warehouse system that includes a plurality of compute pools, and the executing is performed by a first one of the plurality of compute pools; and the method includes: reading the updated row via a lock-free scan transaction, by a second one of the plurality of compute pools of the system, based at least on the appended global metadata associated with the updated row in the global metadata storage.

In an embodiment of the computer-readable storage medium, a first compute pool of the plurality of compute pools performs said executing; and the method further includes: reading the deleted row via a point-in-time transaction, by another compute pool of the plurality of compute pools, based at least on: the appended row locator identifier and the appended version of the transaction in the deleted row file, and the maintained deleted row in the rowgroup.

In an embodiment of the computer-readable storage medium, the method includes: performing said read the updated row from the first blob data structure in a local cache based at least on a determination that the updated row remains present therein.

In an embodiment of the computer-readable storage medium, the method includes: retrieving the updated row from the second blob data structure in the global storage to the first blob data structure based at least on a determination that the updated row is absent from the first blob data structure; and performing said read the updated row from the second blob data structure.

In an embodiment of the computer-readable storage medium, the second blob data structure in the global storage of the system is uncompressed; and the method includes: determining that the second blob data structure has met or exceeded a size threshold; and generating a third blob data structure, in another global storage of the system, that is based at least on the second blob data structure and that is compressed, the third blob data structure being self-describing based at least on the rowgroup metadata and blob metadata that is generated for the third blob data structure and appended thereto.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:
1. A system comprising:
a processing system that includes at least one processor; and
a memory that stores computer-readable instructions that are executable by the processing system to:
execute a transaction, against a data table, that inserts a row in the table to generate an inserted row;

append the inserted row and rowgroup metadata associated with the inserted row to a rowgroup in:
  a first blob (binary large object) data structure in a local cache, and
  a second blob data structure in a global storage of the system; and
append global metadata associated with the inserted row in a global metadata storage, the global metadata including at least one of a mapping of a logical location of the inserted row in the table to a physical location of the rowgroup, a new size of the rowgroup that includes a size of the inserted row, or an updated status indicator for the rowgroup.

2. The system of claim 1, wherein the system is a data warehouse system,
  wherein the transaction is performed by a first compute pool of the data warehouse system, and
  wherein a second compute pool of the data warehouse system is enabled to determine if data in the inserted row is at least one of valid or visible based at least on having access to the global metadata.

3. The system of claim 2, wherein the computer-readable instructions are executable by the processing system to:
  access, by the second compute pool, the data in the inserted row from the second blob based at least on a determination that the data is valid or visible.

4. The system of claim 1, wherein the computer-readable instructions are executable by the processing system to:
  append the rowgroup metadata in a footer of the first blob and in a footer of the second blob generating respective super sets of rowgroup metadata therein; and
  update a respective version and a respective size of the footer of the first blob and in the footer of the second blob based at least on appending the rowgroup metadata.

5. The system of claim 4, wherein the computer-readable instructions are executable by the processing system to:
  subsequent to said update, read from at least one of the first blob or the second blob:
    the rowgroup metadata based at least on a respective known location of the footer of the first blob or the footer of the second blob, and
    data of the inserted row; and
  perform a database operation on the data of the inserted row by a compute pool of the processing system based at least on the rowgroup metadata.

6. The system of claim 4, wherein the global metadata includes the mapping of the logical location of the inserted row in the table to the physical location of the rowgroup; and
  wherein the computer-readable instructions are executable by the processing system to:
    determine the physical location of the rowgroup based at least on the global metadata prior to said read, and perform said read based at least on the physical location being determined.

7. The system of claim 4, wherein the computer-readable instructions are executable by the processing system to:
  perform said append the rowgroup metadata in the footer of the first blob and in the footer of the second blob by overwriting an oldest version of metadata or an aborted version of metadata in the footer of the first blob and in the footer of the second blob;
  execute another transaction against the data table that modifies the inserted row and inserts new rowgroup metadata in the footer of the first blob and in the footer of the second blob;
  mark the new rowgroup metadata as aborted based at least on a determination that the other transaction fails to complete successfully; and
  rollback the other transaction in real time, based at least on at least one of the rowgroup metadata or the global metadata, restoring the inserted row as current data and the rowgroup metadata as current metadata.

8. The system of claim 1, wherein the second blob data structure in the global storage of the system is uncompressed; and
  wherein the computer-readable instructions are executable by the processing system to:
    determine that the second blob data structure has met or exceeded a size threshold; and
    generate a third blob data structure, in another global storage of the system, that is based at least on the second blob data structure and that is compressed, the third blob data structure being self-describing based at least on the rowgroup metadata and blob metadata that is generated for the third blob data structure and appended thereto.

9. A method implemented by a computing system, the method comprising:
  executing a transaction, against a data table, that specifies a row in the table as being deleted to generate a deleted row;
  maintaining the deleted row and rowgroup metadata associated with the deleted row in a rowgroup; and
  appending global metadata associated with the deleted row in a global metadata storage, the global metadata including at least one of a mapping of a logical location of the deleted row in the table to a physical location of the rowgroup, a new size of the rowgroup that includes a reduction of a size of the deleted row, or an updated status indicator for the rowgroup.

10. The method of claim 9, wherein the computing system comprises a data warehouse system that includes a plurality of compute pools, and
  wherein the method further comprises:
  appending a row locator identifier and a version of the transaction in a deleted row file; and
  storing the row locator identifier and the version of the transaction in a first blob (binary large object) data structure of the deleted row file, which is globally accessible in the data warehouse system by each of the plurality of compute pools.

11. The method of claim 10, further comprising:
  reading the deleted row via a point-in-time transaction based at least on:
    the appended row locator identifier and the appended version of the transaction in the deleted row file, and
    the maintained deleted row in the rowgroup.

12. The method of claim 11, wherein a first compute pool of the plurality of compute pools performs said executing; and wherein said reading the deleted row via the point-in-time transaction is performed by another compute pool of the plurality of compute pools.

13. The method of claim 10, wherein the rowgroup is stored in a second blob data structure of a global storage and is uncompressed;
  the method further comprising:
    determining that the second blob data structure has met or exceeded a size threshold; and
    generating a third blob data structure, in another global storage of the system, that is based at least on the second blob data structure, that includes deleted row information, and that is compressed, the third blob data structure being self-describing based at least on the rowgroup metadata and blob metadata that is generated for the third blob data structure and appended thereto.

14. The method of claim 13, further comprising:
deleting or compressing the deleted row file based at least on said generating the third blob data structure.

15. A computer-readable storage medium having program instructions recorded thereon that are executable by a computing system to perform a method, the method comprising:
executing a transaction, against a data table, that updates an existing row in the table to generate an updated row, and that generates a deleted row corresponding to the existing row;
maintaining the existing row, as a deleted row, and information associated with the deleted row in a rowgroup;
appending the updated row and rowgroup metadata associated with the updated row to the rowgroup in:
a first blob (binary large object) data structure in a local cache, and
a second blob data structure in a global storage of the system; and
appending global metadata associated with the updated row in a global metadata storage, the global metadata including at least one of a mapping of a logical location of the updated row in the table to a physical location of the rowgroup, a new size of the rowgroup that includes a size of the updated row, or an updated status indicator for the rowgroup.

16. The computer-readable storage medium of claim 15, wherein the computing system is a data warehouse system that includes a plurality of compute pools, and wherein said executing is performed by a first one of the plurality of compute pools; and
wherein the method comprises:
reading the updated row via a lock-free scan transaction, by a second one of the plurality of compute pools of the system, based at least on the appended global metadata associated with the updated row in the global metadata storage.

17. The computer-readable storage medium of claim 16, wherein a first compute pool of the plurality of compute pools performs said executing; and
wherein the method further comprises:
appending a row locator identifier and a version identifier of the transaction in a deleted row file; and
reading the deleted row via a point-in-time transaction, by another compute pool of the plurality of compute pools, based at least on:
the appended row locator identifier and the appended version identifier of the transaction in the deleted row file, and
the maintained deleted row in the rowgroup.

18. The computer-readable storage medium of claim 15, wherein the method comprises:
performing said read the updated row from the first blob data structure in a local cache based at least on a determination that the updated row remains present therein.

19. The computer-readable storage medium of claim 15, wherein the method comprises:
retrieving the updated row from the second blob data structure in the global storage to the first blob data structure based at least on a determination that the updated row is absent from the first blob data structure; and
performing said read the updated row from the second blob data structure.

20. The computer-readable storage medium of claim 15, wherein the second blob data structure in the global storage of the system is uncompressed; and
wherein the method comprises:
determining that the second blob data structure has met or exceeded a size threshold; and
generating a third blob data structure, in another global storage of the system, that is based at least on the second blob data structure and that is compressed, the third blob data structure being self-describing based at least on the rowgroup metadata and blob metadata that is generated for the third blob data structure and appended thereto.

* * * * *